(12) United States Patent
Ishizu et al.

(10) Patent No.: US 6,529,814 B2
(45) Date of Patent: Mar. 4, 2003

(54) SYSTEM AND METHOD FOR CONTROLLING VEHICLE VELOCITY AND INTER-VEHICLE DISTANCE

(75) Inventors: Takeshi Ishizu, Tokyo (JP); Kazutaka Adachi, Yokohama (JP); Junsuke Ino, Tokyo (JP); Hideki Sudo, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/018,568

(22) PCT Filed: May 14, 2001

(86) PCT No.: PCT/JP01/03974

§ 371 (c)(1),
(2), (4) Date: Dec. 20, 2001

(87) PCT Pub. No.: WO01/87660

PCT Pub. Date: Nov. 22, 2001

(65) Prior Publication Data

US 2002/0173896 A1 Nov. 21, 2002

(30) Foreign Application Priority Data

May 16, 2000 (JP) ............................. 2000-143621
May 19, 2000 (JP) ............................. 2000-148732

(51) Int. Cl.$^7$ ............................................... B60K 31/00
(52) U.S. Cl. .................... 701/96; 701/95; 180/170; 180/179; 340/903; 342/71
(58) Field of Search .............................. 701/96, 95, 93, 701/51; 180/170, 179, 169; 340/435, 436, 903; 342/70, 71

(56) References Cited

U.S. PATENT DOCUMENTS

| 4,621,705 A | 11/1986 | Etoh | 180/169 |
|---|---|---|---|
| 5,230,400 A | 7/1993 | Kakinami et al. | 180/169 |
| 5,396,426 A | 3/1995 | Hibino et al. | 701/96 |
| 5,400,864 A * | 3/1995 | Winner et al. | 701/96 |
| 5,675,518 A * | 10/1997 | Kuroda et al. | 180/169 |
| 5,959,572 A | 9/1999 | Higashimata et al. | 342/70 |
| 5,969,640 A | 10/1999 | Timm et al. | 340/903 |

FOREIGN PATENT DOCUMENTS

| EP | 0 484 995 | 5/1992 |
|---|---|---|
| EP | 0 982 172 | 1/2000 |
| FR | 2 732 651 | 10/1996 |

* cited by examiner

*Primary Examiner*—William A. Cuchlinski, Jr.
*Assistant Examiner*—Marthe Y. Marc-Coleman
(74) *Attorney, Agent, or Firm*—Foley & Lardner

(57) ABSTRACT

In automatic vehicular velocity controlling apparatus and method for automotive vehicle, a target vehicular velocity to maintain a predetermined inter-vehicle distance between a preceding vehicle which is running ahead of the vehicle is set as a first set vehicular velocity and a vehicular velocity of the vehicle (host vehicle) is controlled to give one of the first set vehicular velocity and a second set vehicular velocity by a manual setting through a set switch and an accelerate switch or coast switch if the preceding vehicle is present and is controlled to maintain the vehicular velocity at the second set vehicular velocity if no preceding vehicle is present. Then, when the set vehicular velocity is modified through the above-described accelerate switch or coast switch, a vehicular velocity variation rate is determined in accordance with a deviation between the actual vehicular velocity and a newly set vehicular velocity after the modification of the vehicular occupant's vehicular velocity.

12 Claims, 15 Drawing Sheets

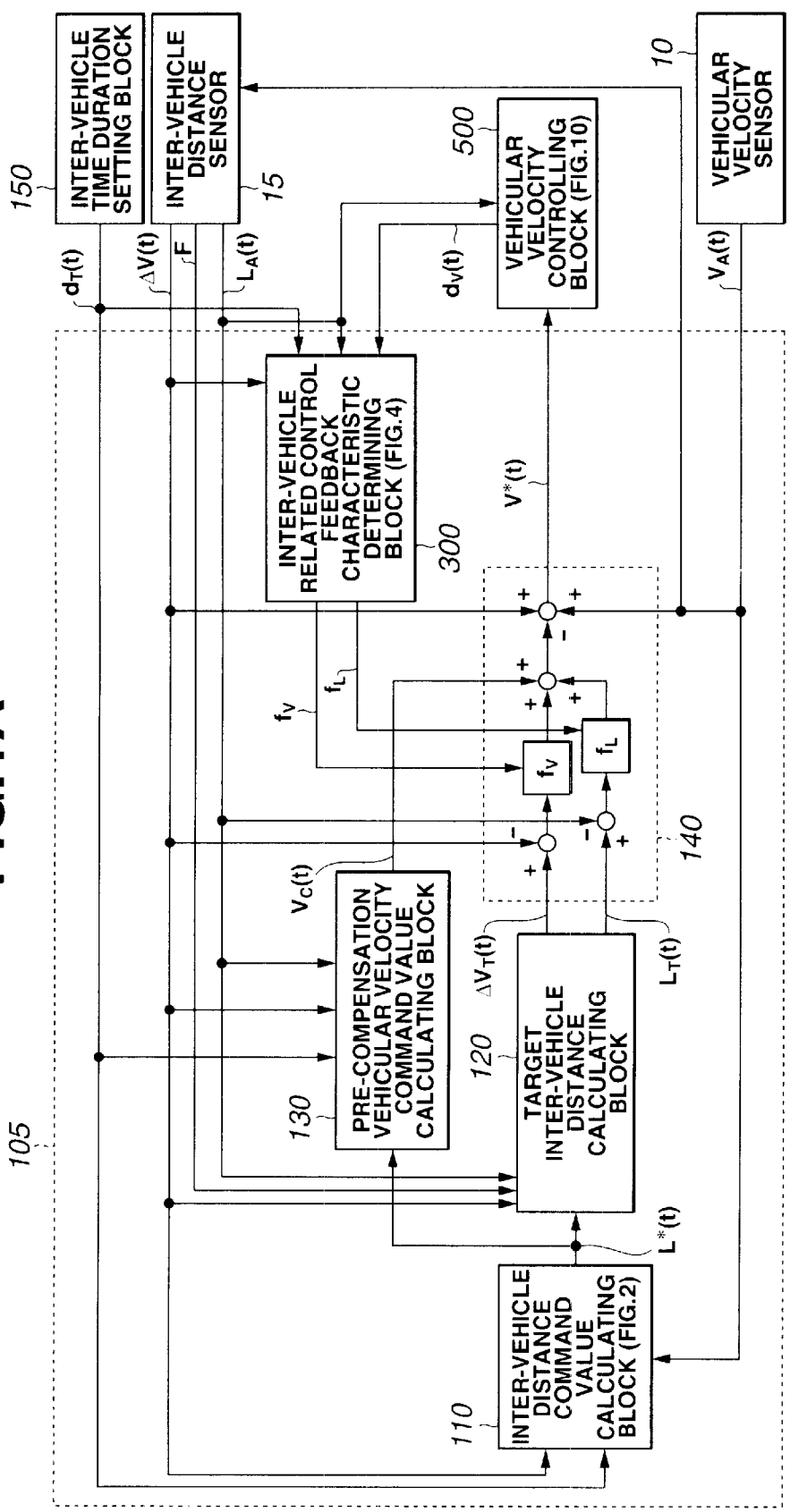
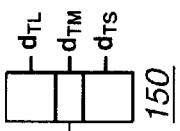
FIG.1A
FIG.1B

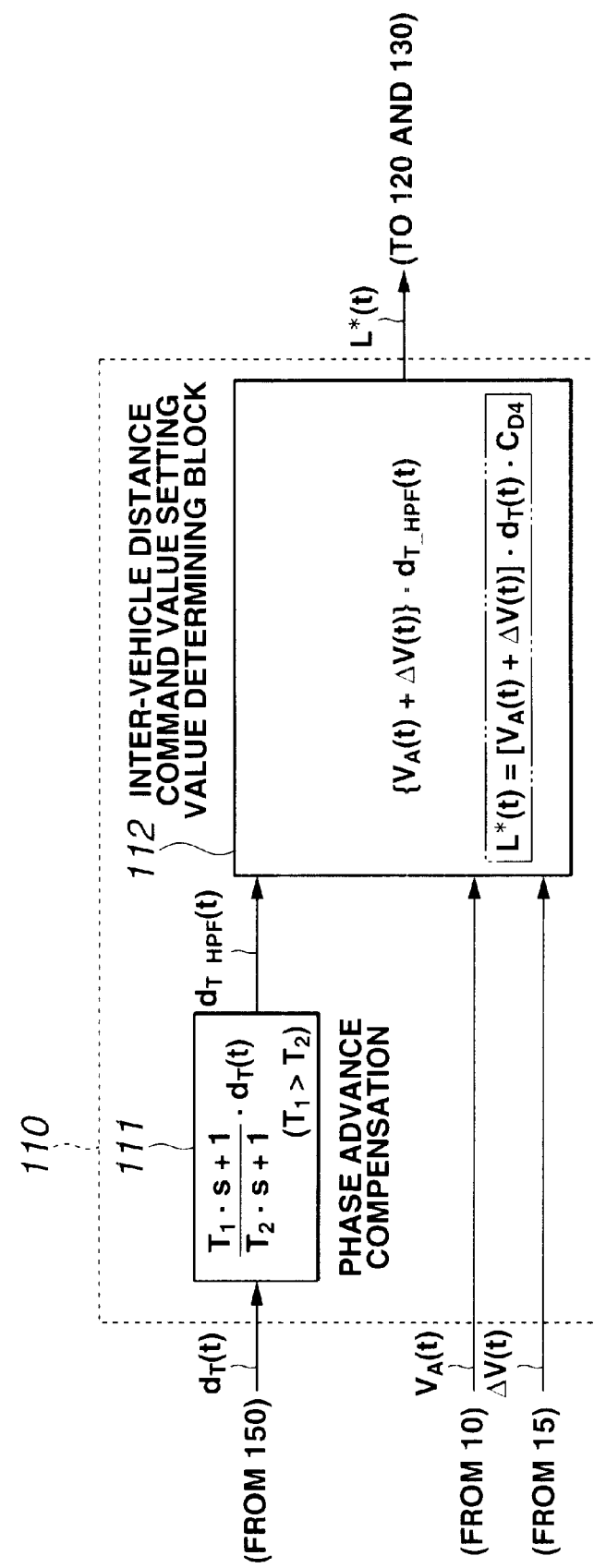

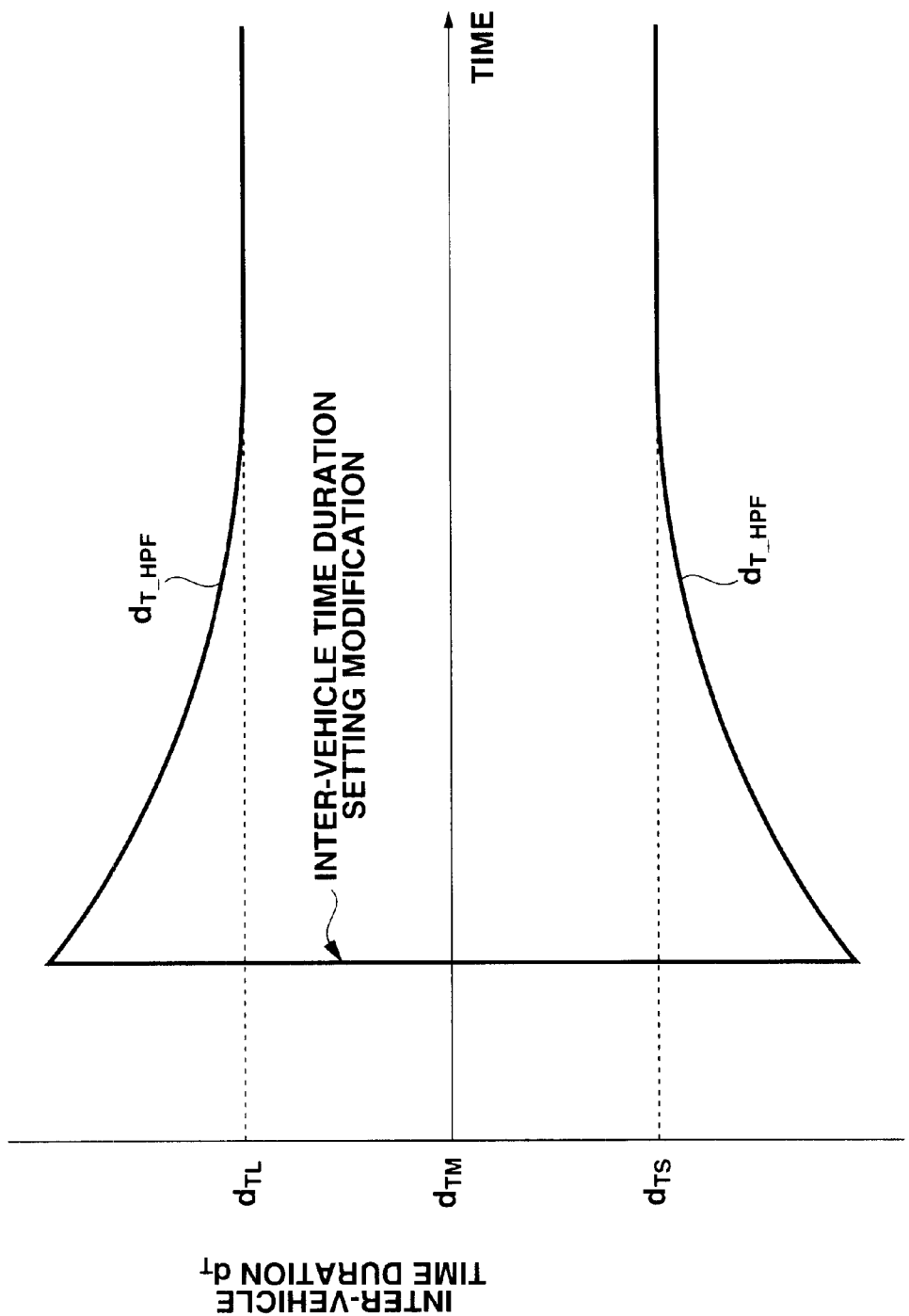

SYSTEM AND METHOD FOR CONTROLLING VEHICLE VELOCITY AND INTER-VEHICLE DISTANCE

TECHNICAL FIELD

The present invention relates to an automatic vehicular velocity controlling system and method having such an inter-vehicle distance controlling function as controlling a vehicular velocity to maintain an appropriate inter-vehicle distance.

BACKGROUND ART

An European Patent Application First Publication No. EP 0 982 172 A2 published on Mar. 1, 2000 exemplifies a previously proposed automatic vehicular velocity controlling system.

A U.S. Pat. No. 5,959,572 issued on Sep. 28, 1999 also exemplifies another previously proposed automatic vehicular velocity controlling system.

In such a previously proposed automatic vehicular velocity controlling apparatus as described in the above-described European Patent Application First Publication, a vehicular velocity of an automotive vehicle in which the above-described vehicular velocity controlling system is mounted (hereinafter, also referred to as a host vehicle) is controlled so as to provide one of a target vehicular velocity to maintain the inter-vehicle distance and a set vehicular velocity whose magnitude is smaller than the other and so as to maintain the vehicular driver's set vehicular velocity and so as to maintain the vehicular driver's set vehicular velocity in a case where no preceding vehicle running ahead of the vehicle is present.

Then, when the vehicular driver operates a coast switch to reduce the set vehicular velocity when operated or an accelerate switch (ACC switch) to increase the set vehicular velocity when operated, the set vehicular velocity is varied by a predetermined velocity so that the vehicular velocity is varied by a predetermined velocity so that the vehicular velocity is controlled by a predetermined vehicular velocity variation rate (viz., by a predetermined acceleration or deceleration) with the set vehicular velocity after the added predetermined vehicular velocity variation rate as a new target vehicular velocity.

DISCLOSURE OF THE INVENTION

Since, in the previously proposed automatic vehicular velocity controlling system, an inter-vehicle distance control and a vehicular velocity control are combined to control the vehicular velocity, an actual vehicular velocity is not always coincident with the set vehicular velocity.

For example, in a case where the target vehicular velocity to maintain a predetermined inter-vehicle distance is smaller in magnitude (viz. lower) than the driver's set vehicular velocity, the actual vehicular velocity is controlled to become coincident with the target vehicular velocity.

Hence, in a case where the actual vehicular velocity is remarkably different from the set vehicular velocity, a vehicular motion from a time at which the vehicular driver modifies the set vehicular velocity up to a time at which the actual vehicular velocity converges to the set vehicular velocity often does not match with the driver's sense of driving, viz., the driver often gives an insufficient feeling to the host vehicle.

For example, suppose that, in a case where the host vehicle is running at the actual vehicular velocity of 80 Km/h even with the set vehicular velocity of 100 Km/h because the preceding vehicle is present and the inter-vehicle distance control is activated, the driver operates the coast switch to try to decelerate the vehicle since the host vehicle approaches a toll gate so that the set vehicular velocity is reduced to 70 Km/h.

In this supposition, although the set vehicular velocity is remarkably modified from 100 Km/h to 70 Km/h, the actual vehicular velocity is slightly reduced from 80 Km/h to 70 Km/h.

In addition, since, in a case where no preceding vehicle is present, the actual vehicular velocity is controlled at 100 Km/h if the set vehicular velocity is 100 Km/h. In this case, if the set vehicular velocity s remarkably modified. In such a case as described above, the vehicular velocity is modified by a constant acceleration/deceleration.

In the former case where the slight deceleration is needed, the deceleration is too large. In the latter case when the remarkable deceleration is needed, it takes a lot of time to the time at which the vehicular velocity is converged to the set vehicular velocity.

It is therefore an object of the present invention to provide automatic vehicular velocity controlling system and method capable of performing a vehicular velocity control without insufficient feeling given by the vehicular driver, i.e., which matches with the driver's sense of driving even if the set vehicular velocity is different from the actual vehicular velocity.

According to one aspect of the present invention, there is provided an automatic vehicular velocity controlling system for an automotive vehicle, comprising; a vehicular velocity controlling command value determining section that selectively determines a vehicular velocity controlling command value from one of a first set vehicular velocity based on an inter-vehicle distance control for a preceding vehicle which is running ahead of the vehicle and a second set vehicular velocity based on a manual setting depending upon a magnitude of which one is smaller than the other and depending upon whether the preceding vehicle is present; a vehicular drive controlling section that drivingly controls one of a vehicular engine, a vehicular transmission, and a vehicular brake system to make an actual vehicular velocity substantially equal to the vehicular velocity controlling command value; a vehicular velocity controlling vehicular velocity command value modification determining section that determines whether a modification of the vehicular velocity controlling command value to a new one is made; and a vehicular velocity command value variation rate determining section that determines a deviation between the new vehicular velocity command value and the actual vehicular velocity and determines a variation rate for the vehicular velocity to reach to the new vehicular velocity command value when the vehicular velocity command value modification determining section determines that the modification is made in such a manner that as a magnitude of the deviation becomes larger, the variation rate becomes larger and as the magnitude of the deviation becomes smaller, the variation rate becomes smaller.

According to another aspect of the present invention, there is provided. An automatic vehicular velocity controlling method for an automotive vehicle, comprising; selectively determining a vehicular velocity controlling command value from one of a first set vehicular velocity based on an inter-vehicle distance control for a preceding vehicle which is running ahead of the vehicle and a second set vehicular velocity based on a manual setting depending upon a magnitude of which one is smaller than the other and depending upon whether the preceding vehicle is present; drivingly controlling one of a vehicular engine, a vehicular transmission, and a vehicular brake system to make an actual vehicular velocity substantially equal to the vehicular velocity controlling command value; determining whether a modification of the vehicular velocity controlling command value to a new one is made; and determining a deviation between the new vehicular velocity command value and the actual vehicular velocity and determines a variation rate for the vehicular velocity to reach to the new vehicular velocity command value when the vehicular velocity command value modification determining section determines that the modification is made in such a manner that as a magnitude of the deviation becomes larger, the variation rate becomes larger and as the magnitude of the deviation becomes smaller, the variation rate becomes smaller.

This disclosure of the invention does not necessarily describe all necessary features so that the invention may also be a sub-combination of these described features.

BRIEF DESCRIPTION OF THE DRAWINGS

FIG. 1A is a functional block diagram of a whole automatic vehicular velocity controlling system in a preferred embodiment according to the present invention.

FIG. 1B is a schematic top view of an example of an inter-vehicle time duration setting switch of an inter-vehicle time duration setting block shown in FIG. 1A.

FIG. 2 is a functional block diagram of an inter-vehicle distance command value calculating block shown in FIG. 1A.

FIG. 3 is a characteristic graph representing a step response of a transfer function of a set inter-vehicle time duration phase advance compensating block shown in FIG. 1A.

BEST MODE FOR CARRYING OUT THE INVENTION

Figure 4:
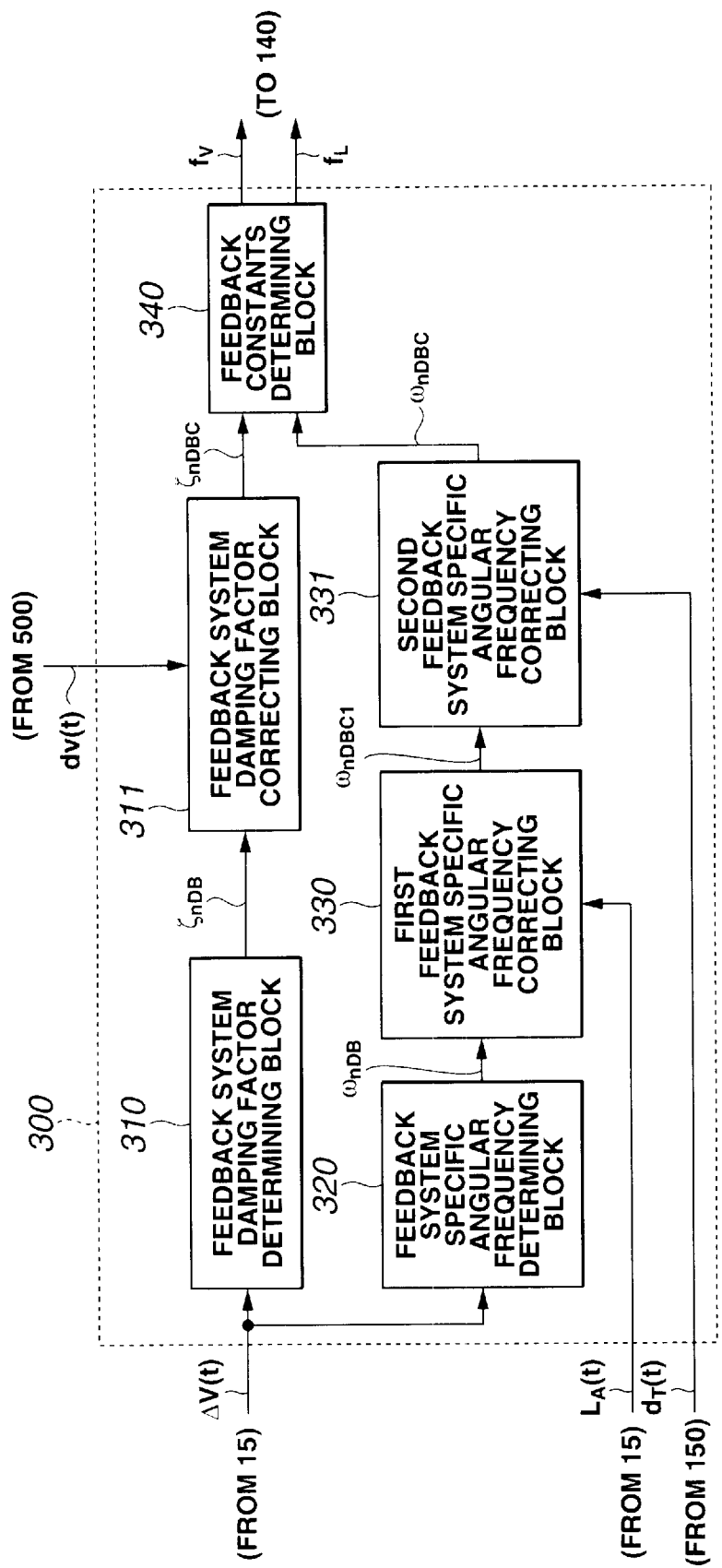
FIG. 4 is a functional block diagram of a vehicular velocity control system feedback characteristic determining block shown in FIG. 1A.

Reference will hereinafter be made to the drawings in order to facilitate a better understanding of the present invention.

FIG. 1A shows a whole functional block diagram of an automotive vehicular velocity controlling system in a preferred embodiment according to the present invention applicable to an automotive vehicle.

An inter-vehicle distance controlling block 105 (a portion enclosed by a broken line in FIG. 1A) is constituted by a microcomputer and its peripheral circuitry. Each block present inside of inter-vehicle distance controlling block 105 shown in FIG. 1A is a block representation of respective contents of calculations implemented by the microcomputer.

The inter-vehicle distance controlling block 105 receives an inter-vehicle time duration signal $d_T(t)$, a relative velocity signal $\Delta V(t)$, and a vehicular velocity signal $V_A(t)$ of the vehicle (host vehicle), calculates and supplies an inter-vehicle related controlling vehicular velocity command value V*(t) to a vehicular velocity controlling block 500. A detailed functional explanation of the vehicular velocity controlling block 500 will be described later with a chief reference to FIG. 10.

It is noted that a symbol (t) denotes a value which varies with time t and is not always attached to another symbol in the drawings.

Vehicular velocity sensor 10 detects the vehicular velocity of the host vehicle from a revolution speed of one or any two of tire wheels of the vehicle.

Inter-vehicle distance sensor 15 which, for example, utilizes a laser radar detects an inter-vehicle distance $L_A(t)$ to a preceding vehicle running ahead of the host vehicle according to reflected waves of light beams or electromagnetic waves and a relative velocity $\Delta V(t)$ from a change in time of the detected inter-vehicle spatial distance and receives the vehicular velocity signal $V_A(t)$ from the vehicular velocity sensor 10, and outputs a (active) flag F (hereinafter referred to as a preceding vehicle flag) upon a decision that an object present in front of the host vehicle is the preceding vehicle in a case where a difference between the relative velocity ΔV(t) and the host vehicular velocity $\Delta_A(t)$ falls out of a range expressed as, for example, 5%×$V_A$(t) Km/h.

Inter-vehicle time duration setting block 150 sets the inter-vehicle time duration $d_T(t)$ in response to a manipulation by the vehicular driver.

It is noted that the inter-vehicle time duration $d_T(t)$ is a time duration from a time at which the preceding vehicle is stopped to a time for the host vehicle to reach to the stopped preceding vehicle at the present vehicular velocity, if the preceding vehicle which follows the host vehicle is stopped.

Inter-vehicle time duration setting block 150 includes a switch such as shown in FIG. 1B to changeover three stages of, for example, remote (long) distance, middle distance, and close (short) distance according to the vehicular driver's operation thereof so that three-kinds of inter-vehicle time durations are selected. For example, the remote distance indicates 2.2 seconds, the middle distance indicates 1.8 seconds, and the close distance indicates 1.4 seconds. 1.8 seconds in the case of the middle distance corresponds to about 50 meters of the inter-vehicle distance when the host vehicle is running at 100 Km/h.

An inter-vehicle distance command value calculating block 110 constitutes a part of the inter-vehicle distance controlling block 105 shown in FIG. 1A and includes, as shown in FIG. 2, a set inter-vehicle time duration phase advance compensating block 111 and inter-vehicle distance command value determining section 112.

Set inter-vehicle time duration phase advance compensating block 111 receives inter-vehicle time duration $d_T(t)$ from inter-vehicle time duration setting block 150 and outputs an inter-vehicle time duration phase advance compensation value $d_{T\_HPF}(t)$ in a case where the present inter-vehicle time duration $d_T(t)$ is different from a previous inter-vehicle time duration $d_T(t-1)$, viz., when the inter-vehicle distance controlling block 105 determines that the vehicular driver has tried to modify the setting of the inter-vehicle time duration through inter-vehicle time duration setting block 150.

The following equation represents a transfer function of inter-vehicle time duration phase advance compensating block:

$$D_{T\_HPF}(t) = d_T(t) \cdot (T_1 \cdot s + 1)/(T_2 \cdot s + 1)$$

In this equation, $T_1$ and $T_2$ denote time constants and $T_1 > T_2$ and s denotes a differential operator.

This time constant condition described above can cause the phase of the inter-vehicle time duration $d_T(t)$ to be advanced with respect to the previous thereof.

FIG. 3 shows a step response of the transfer function expressed above in the inter-vehicle time duration phase advance compensating block 111.

As shown in FIG. 3, a phase advance compensation can be implemented to the inter-vehicle time duration $d_T(t)$ such as shown in the transfer function of set inter-vehicle time duration phase advance compensating block 111.

In details, in the case where the vehicular driver modifies the setting of the inter-vehicle time duration, for example, as shown by an example of FIG. 3, in a case where the setting is modified in such a manner as to modify the inter-vehicle time duration from $d_{TM}$ which corresponds to the middle distance to $d_{TL}$ which corresponds to the remote distance or $d_{TS}$ which corresponds to the close distance, a change quantity of the inter-vehicle time duration is temporarily enlarged rather than a target new inter-vehicle time duration of $d_{TL}$ or $d_{TS}$ (if the inter-vehicle time duration is largely modified, the value is more larger and if this time duration is small modified, the value is more smaller) and, thereafter, the time duration is converged to new target inter-vehicle time duration $d_{TL}$ or $d_{TS}$.

Consequently, in the case where the vehicular driver modifies the setting of the inter-vehicle time duration, the set inter-vehicle time duration can be controlled to speedily responded to an intention of the vehicular driver.

In addition, referring to FIG. 2, inter-vehicle distance command value determining block 112 calculates an inter-vehicle distance command value L*(t) from vehicular velocity $V_A(t)$, relative velocity ΔV(t), and inter-vehicle time duration phase advance compensation value $d_{T\_HPF}(t)$ set arbitrarily by the vehicular driver in accordance with the following equation.

$$L^*(t) = \{V_A(t) + \Delta V(t)\} \cdot d_{T\_HPF}(t)$$

As defined in this equation, the inter-vehicle distance command value L*(t) is given by an addition of the vehicular velocity $V_A(t)$ to relative velocity ΔV(t) which is multiplied by the time duration phase advance compensation value $d_{T\_HPF}(t)$.

Hence, in a case where the inter-vehicle time duration is modified as described above, the change quantity of the time duration is temporarily enlarged and, thereafter, the inter-vehicle time duration is converged to the new target inter-vehicle time duration. Therefore, the inter-vehicle distance is quickly changed upon the operation of the setting switch of inter-vehicle time duration setting block 150.

After the modification of the setting of the inter-vehicle time duration to enlarge the inter-vehicle time duration since, for example, the vehicular driver decides that the vehicle is too be approached to the preceding vehicle, the inter-vehicle distance is immediately changed so that there is no possibility that the vehicular driver gives the insufficient feeling due to an moderate change in the inter-vehicle distance.

Next, referring back to FIG. 1A, a target inter-vehicle distance calculating block 120 receives the preceding vehicle flag F, relative velocity ΔV(t) , and inter-vehicle distance $L_A(t)$ from the inter-vehicle distance sensor 15, sets relative velocity ΔV(F) and inter-vehicle distance $L_A(F)$ at a time point at which the preceding vehicle is recognized as initial values of a target relative velocity $\Delta V_T(t)$ and a target inter-vehicle distance $L_T(t)$, and calculates target inter-vehicle distance $L_T(t)$ and target relative velocity $\Delta V_T(t)$ in a case where the input is the inter-vehicle distance command value L*(t) using a filter represented by matrix equations shown below.

$$\frac{d}{dt}\begin{bmatrix} L_T(t)' \\ \Delta V_T(t)' \end{bmatrix} = \begin{bmatrix} 0 & 1 \\ -\omega_{nT}^2 & -2\zeta_T \cdot \omega_{nT} \end{bmatrix} \begin{bmatrix} L_T(t)' \\ \Delta V_T(t)' \end{bmatrix} + \begin{bmatrix} 0 \\ \omega_{nT}^2 \end{bmatrix} L^*(t) \quad (1a)$$

$$\begin{bmatrix} L_T(t) \\ \Delta V_T(t) \end{bmatrix} = \begin{bmatrix} e^{-Lv \cdot s} & 0 \\ 0 & e^{-Lv \cdot s} \end{bmatrix} \begin{bmatrix} L_T(t)' \\ \Delta V_T(t)' \end{bmatrix} \quad (1b)$$

In the above matrix equations (1a) and (1b), $\omega_{nT}$ denotes a specific angular frequency of a target inter-vehicle distance response and a value thereof arbitrarily set by a designer, $\zeta_T$ denotes a damping factor of the target inter-vehicle distance response and a value thereof arbitrarily set by the designer, and LV denotes a dead time due to a lag in a power train system of the vehicle.

For the equation shown in (1a) and (1b), a transfer function in a case where the inter-vehicle distance command value L*(t) is the input and the target inter-vehicle distance L(t) is the output is expressed in the following equation:

$$L_T(t) = \omega_{nT}^2 \cdot e^{-LV \cdot s} \cdot L^*(t)/(s^2 + 2\zeta_T \cdot s + \omega_{nT}^2).$$

Pre-compensation vehicular velocity command value calculating block 130 is constituted by an inverse of a transfer function having a product between a transfer function Gv(s) '(Gv(s)'=1/(Tv·s+1)) which neglects a dead time of vehicular velocity controlling block 500 and an integrator and pre-compensation vehicular velocity command value calculating block 130 calculates $V_c(t)$ shown in the following equation: Namely, $$Vc(t) = \omega_{nT}^2 \cdot s(Tv \cdot s+1) \cdot L^*(t)/(s^2 + 2\zeta T \cdot s + \omega_{nT}^2).$$

In the above equation, Tv denotes a time constant used in the transfer function of vehicular velocity controlling block 500.

In addition, when pre-compensation inter-vehicle distance command value Vc(t) is calculated from a state space representation using the equations (1a) and (1b), the following equation is given.

$$V_C(t) = \begin{bmatrix} 1 & T_V \end{bmatrix} \begin{bmatrix} L_T(t)' \\ \Delta V_T(t)' \end{bmatrix} \quad (2)$$

An inter-vehicle related vehicular velocity command value calculating block 140 calculates an inter-vehicle related controlling vehicular velocity command value V*(t) using the following equation according to actual inter-vehicle distance $L_A(t)$, actual vehicular velocity $V_A(t)$, actual relative velocity $\Delta V(t)$, target inter-vehicle distance $L_T(t)$, and target relative velocity $\Delta V_T(t)$, and feedback constants $f_L$ and fv as will be described later.

That is to say, $$V^*(t) = V_A(t) + \Delta V(t) - Vc(t) - \{L_T(t) - L_A(t)\} \cdot f_L - \{\Delta V_T(t) - \Delta V(t)\} \cdot f_V.$$

Inter-vehicle related feedback characteristic determining block 300 receives inter-vehicle distance $L_A(t)$, relative velocity $\Delta V(t)$, and set inter-vehicle time duration $d_T(t)$ and calculates feedback constants $f_L$ and $f_V$.

Hereinafter, a determining method of feedback constants $f_L$ and $f_V$ with reference to FIG. 4 will be described below.

FIG. 4 shows a functional block diagram of inter-vehicle related control feedback characteristic determining block 300.

Inter-vehicle related control feedback characteristic determining block 300 includes: a feedback system damping factor determining block 310; a feedback system damping factor correcting block 311; a feedback system specific angular frequency determining block 320; a feedback system specific angular frequency first correcting block 330; a feedback system specific angular frequency second correcting block 331; and feedback constants determining block 340, each for inter-vehicle distance controlling block 105.

The block diagram of this inter-vehicle related feedback characteristic determining block 300 is expressed in terms of a transfer function $G_{DS}$ from target inter-vehicle distance $L_T(t)$ to actual inter-vehicle distance $L_A(t)$ as follows: That is to say, $$G_{DB}(s) = \{\omega_{nDB}^2(T_{VB} \cdot s+1)\}/(s^2 + 2\zeta_{nDB} \cdot \omega_{nDB} + \omega_{nDB}^2),$$

wherein $\omega_{nDB} = (f_V + 1)/2\sqrt{(f_L/T_V)}$ (denotes a damping factor in the inter-vehicle related feedback system), $\omega_{nDB} = \sqrt{(f_L/T_V)}$, $T_{VB} = f_L/T_V$; a value corresponding to a zero (point) in the inter-vehicle related control feedback, and Tv denotes the time constant on a vehicular velocity feedback control in the vehicular velocity controlling block 500.

Figure 5A:
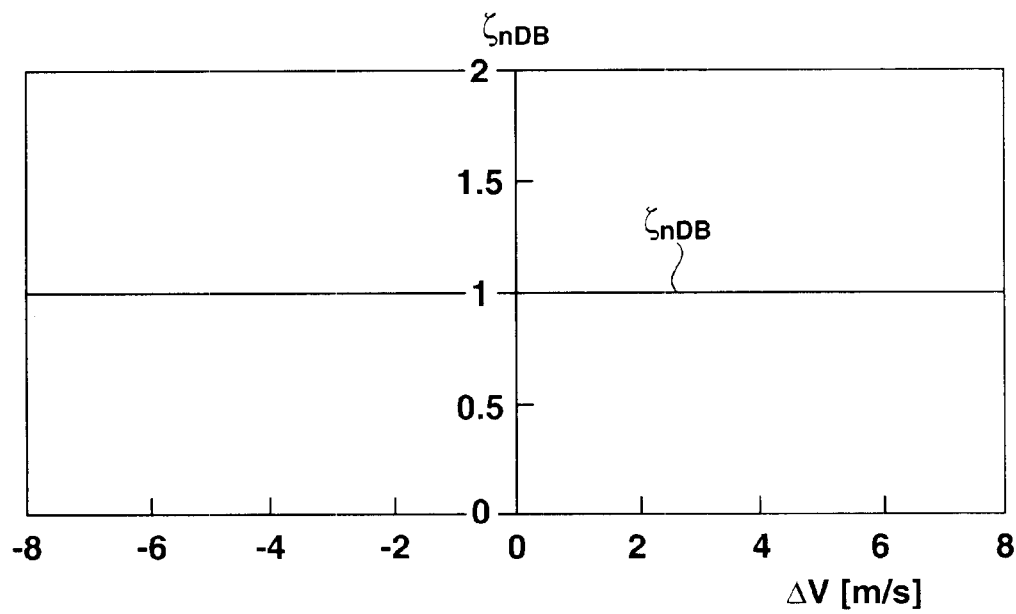
FIGS. 5A and 5B are characteristic graphs used to determine respective coefficients in the vehicular velocity control system feedback characteristic determining block shown in FIGS. 1 and 4, particularly FIG. 5A representing a map to determine an inter-vehicle distance control feedback system damping factor $\zeta_{nDB}$ and FIG. 5B representing a map to determine an inter-vehicle distance control feedback system specific angular frequency $\omega_{nDB}$, respectively.

A feedback system damping factor determining block 310 inputs relative velocity $\Delta V(t)$ and determines an inter-vehicle related control feedback system damping factor $\zeta_{nDB}$ from a map shown in FIG. 5A in accordance with relative velocity $\Delta V(t)$.

As shown in FIG. 5A, $\zeta_{nDB}$ is constant even if relative velocity $\Delta V(t)$ is varied. This is because it is most appropriate that the value of $\zeta_{nDB}$ is set to 1 (when $\zeta_{nDB}=1$, a critical damping occurs) in order to prevent a fluctuation tendency and to improve a response characteristic.

Figure 5B:
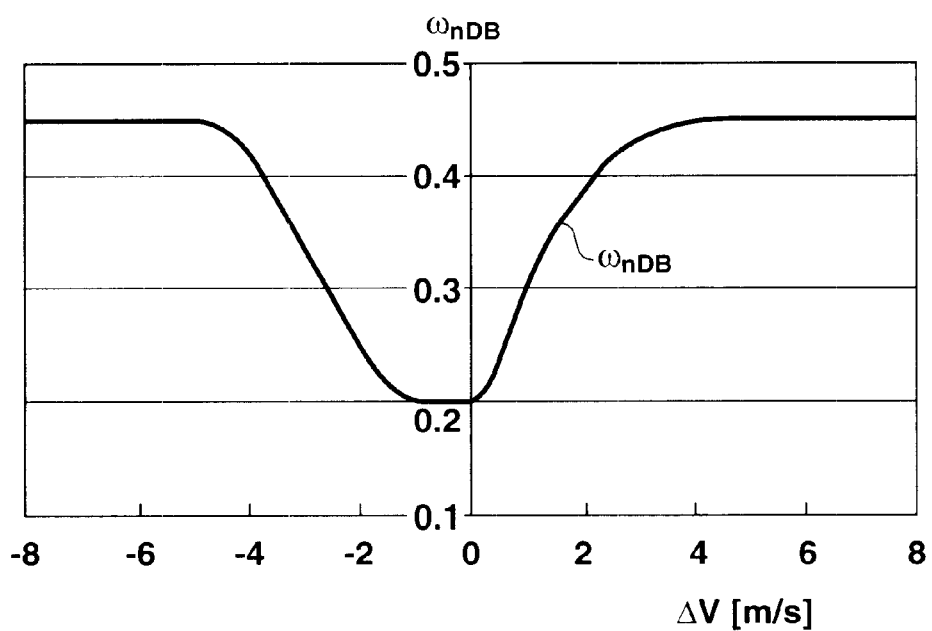

Feedback system damping factor determining block 320 inputs relative velocity $\Delta V(t)$ and determines the specific angular frequency $\omega_{nDB}$ in the inter-vehicle related feedback control system according to a map shown in FIG. 5B with respect to relative velocity $\Delta V(t)$.

As shown in FIG. 5B, the specific angular frequency $\omega_{nDB}$ is made smaller (lowered) if an absolute value of relative velocity $\Delta V(t)$ is small so that a slow control is carried out. If $\omega_{nDB}$ is made larger (higher), a quick control is carried out in order not to develop a lag (delay) to a dynamic motion of the preceding vehicle.

Feedback system specific angular frequency first correcting block 330 determines a correction coefficient CD1 to correct the specific angular frequency $\omega_{nDB}$ of the inter-vehicle related control feedback system, corrects specific angular frequency $\omega_{nDB}$ by $C_{D1}$, and outputs a post-correction specific angular frequency $\omega_{nDBC1}$.

That is to say, $\omega_{nDBC1}$ can be expressed as follows:

$$\omega_{nDBC1} = C_{D1} \cdot \omega_{nDB}.$$

Figure 6:
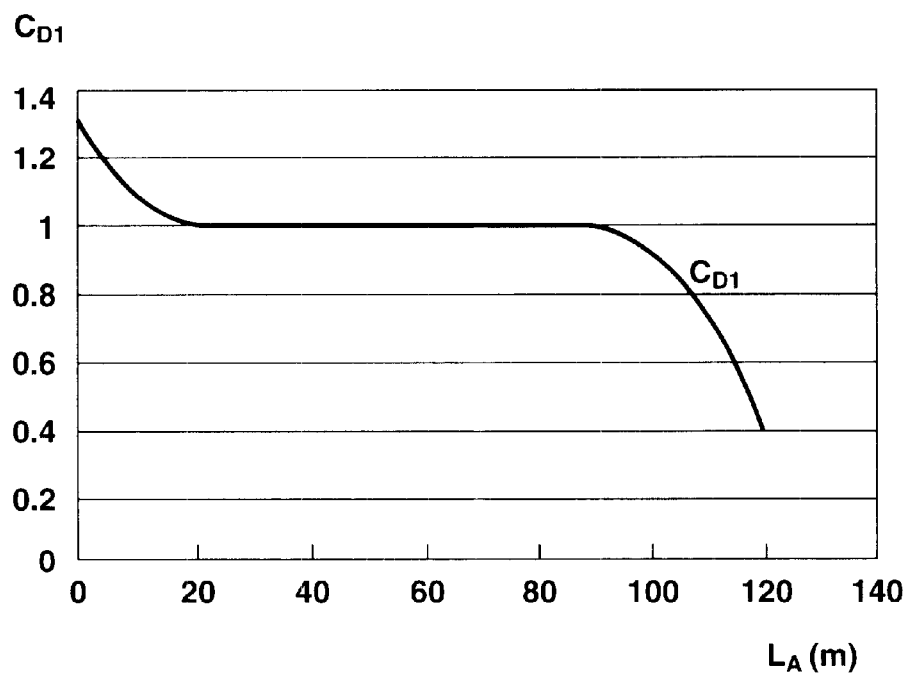
FIG. 6 is a characteristic graph representing a map to determine a correction coefficient $C_{D1}$.

Correction coefficient $C_{D1}$, as appreciated from FIG. 6, is varied in such a manner that the correction coefficient $C_{D1}$ is a value equal to or larger than 1 if the inter-vehicle distance is shorter than a first predetermined value (for example, about 20 meters) so that the specific angular frequency $\omega_{nDB}$ is enlarged (made higher) to quicken the response characteristic of the inter-vehicle distance control and $C_{D1}$ is a value less than one if the inter-vehicle is longer than a second predetermined value (for example, about 90 meters) so that the specific angular frequency $\omega_{nDB}$ is made smaller (lowered) to slow the response characteristic of the inter-vehicle distance feedback control.

As described above, the value of specific angular frequency $\omega_{nDB}$ is corrected in accordance with the detected inter-vehicle distance. In details, when the inter-vehicle distance is large (long), the specific angular frequency $\omega_{nDB}$ is made small (lowered). When the inter-vehicle distance is small (short), the specific angular frequency $\omega_{nDB}$ is made large (high). Thus, if the inter-vehicle distance is long, the response characteristic is made dull (slowed) so that even when the relative velocity is largely varied due to a calculation error of detecting the relative velocity, the correction of the response characteristic can prevent a steep or sharp control from occurring. Consequently, the vehicular driver does not give the un-matched feeling to the driving sense.

Feedback system specific angular frequency second correcting block 331 receives the inter-vehicle time duration $d_T(t)$ and post-correction specific angular frequency $\omega_{nDBC1}$ of the inter-vehicle related control feedback system and temporarily enlarges $\omega_{nDBC1}$ by changing another correction coefficient $C_{D2}$ from a preset value of 1 to 1.5 for one second in a case where $d_T(t-1)$ to $d_T(t)$, namely, in a case where the driver has modified the setting of the inter-vehicle time duration. In a normal state, the value of the other correction coefficient $C_{D2}$ is 1. However, only if the setting of the inter-vehicle time duration is modified, $C_{D2}$ is changed from 1 to 1.5 (or larger) so that $\omega_{nDBC1}$ is temporarily enlarged to achieve a quick modification of the actual inter-vehicle time duration.

It is noted that $\omega_{nDBC}$ after this correction is as follows:

$$\omega_{nDBC} = C_{D2} \cdot \omega_{nDBC1}.$$

The above-described feedback system specific angular frequency second correcting block 331 improves the response characteristic by enlarging the specific angular frequency (gain) of the inter-vehicle distance feedback system. In the above-described feedback system specific angular frequency second correcting block 331, however, the vehicle would respond oversensitively if a quick motion of the preceding vehicle is made so that a vehicular comfortability would become worsened to some degree.

In this respect, as described in the inter-vehicle distance command value determining block 112, the value of the inter-vehicle time duration is temporarily enlarged or made smaller than the new inter-vehicle time duration $d_{TL}$ or $d_{TS}$ and, thereafter, converged the new one $d_{TL}$ or $d_{TS}$ when the inter-vehicle time duration is modified. Consequently, the above-described oversensitive response cannot be found.

Feedback system damping factor correcting block 311 receives an external disturbance value $d_V(t)$ calculated by drive torque command value calculating block 530 of vehicular velocity controlling block 500, receives the specific angular frequency $\omega_{nDB}$ from the feedback system damping factor determining block, and estimates a road surface gradient $\phi_A(t)$ from feedback system damping factor determining block 310.

Figure 7:
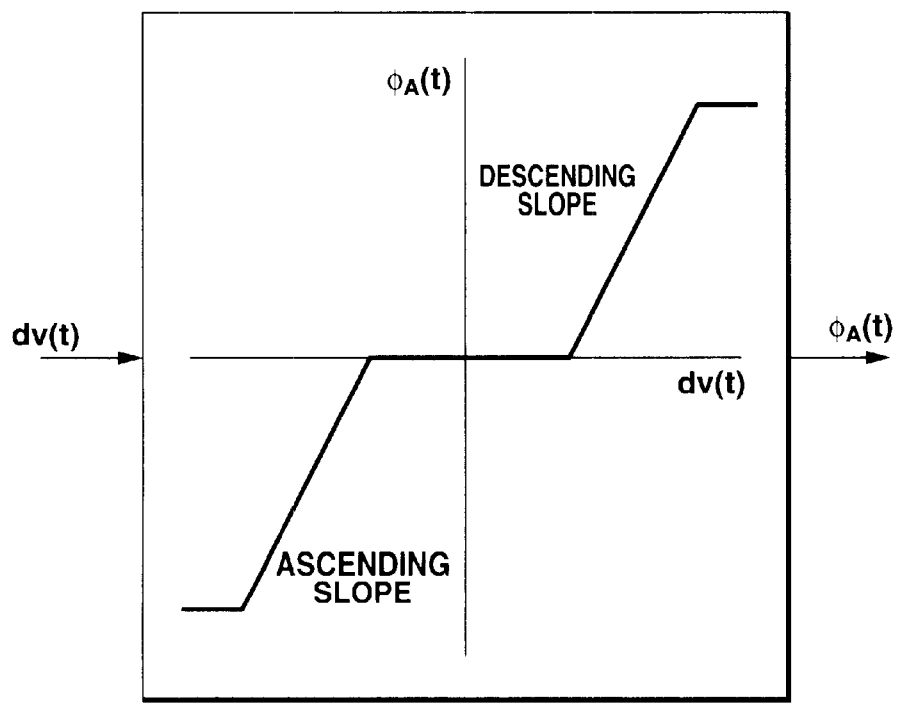
FIG. 7 is a characteristic graph representing a map to determine a road surface gradient $\phi_A(t)$.

Specifically, as shown in FIG. 7, if the external disturbance value $d_V(t)$ is negative, the gradient indicates an ascending slope. If it is positive, the gradient indicates a descending slope. Thus, road surface gradient $\phi_A(t)$ is derived.

Figure 8:
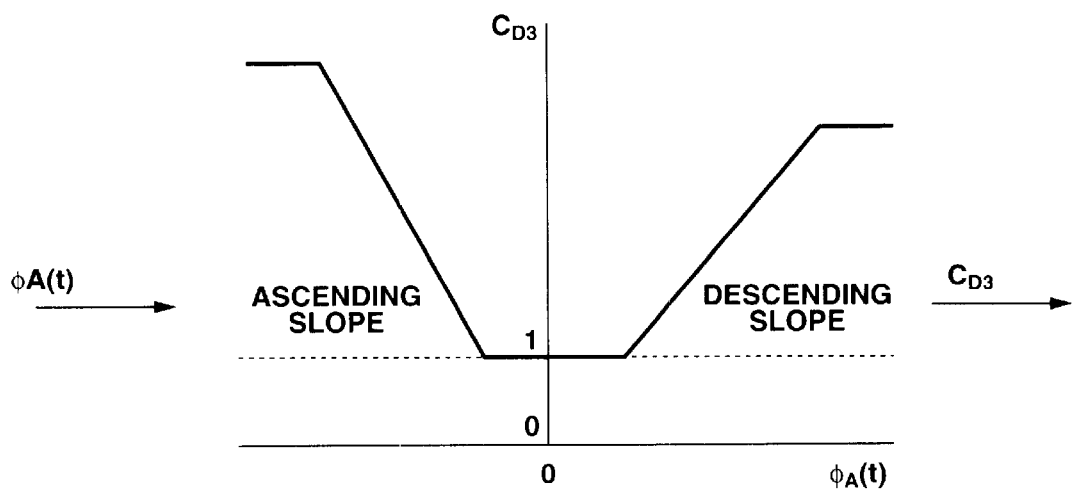
FIG. 8 is a characteristic graph representing a map to determine a correction coefficient $C_{D3}$.

Thus, the correction coefficient $C_{D3}$ is derived on the basis of the map shown in FIG. 8. The damping factor $\zeta_{nBC}$ is determined by correcting the damping factor $\zeta_{nDB}$ of the inter-vehicle related control feedback system.

That is to say, the damping factor $\zeta_{nDBC}$ is expressed as follows:

That is to say, $$\zeta_{DBC} = \zeta_{nDB} \cdot C_{D3}.$$

The value of correction coefficient $C_{D3}$, as appreciated from FIG. 8, is set to 1, when the road surface gradient $\phi_A(t)$ falls in a predetermined range. As the absolute value of the road gradient $\phi_A(t)$ becomes larger, the value of $C_{D3}$ is set to becomes larger than 1.

Feedback constants determining block 340 receives damping factor $\zeta_{nDBC}$ of inter-vehicle distance control feedback system and calculates feedback constants $f_L$ and $f_V$ from the equation expressed below.

$$f_L = \omega_{nDBC}^2 \cdot Tv;$$

and $$f_V = 2 \cdot \zeta_{nDB} \cdot \omega_{nDBC} \cdot Tv - 1.$$

Consequently, as the inter-vehicle distance $L_A(t)$ becomes short, the correction coefficient $C_{D2}$ becomes small but the specific angular frequency $\omega_{nDB}$ becomes large.

Then, both of feedback constants $f_L$ and $f_V$ are enlarged so that the deceleration becomes faster. At this time, if the inter-vehicle distance $L_A(t)$ is short, specific angular frequency $\omega_{nDBC}$ is enlarged and, in place of the enlargement for the feedback constants $f_L$ and $f_V$, inter-vehicle related feedback constant $f_L$ may directly be corrected in accordance with the inter-vehicle distance.

In addition, as the gradient of road becomes enlarged, correction coefficient $C_{D3}$ becomes large, the damping factor $\zeta_{nDBC}$ is accordingly enlarged, and feedback constant $f_V$ is enlarged so that the deceleration is made faster.

It is noted that as the gradient of road becomes large, the correction coefficient $C_{D3}$ becomes large and damping factor $\zeta_{nDB}$ becomes large so that the deceleration becomes faster.

Figure 9:
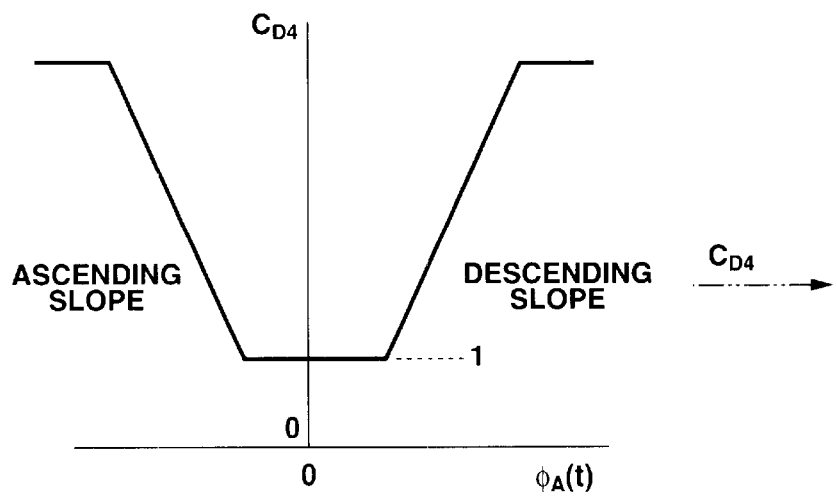
FIG. 9 is a characteristic graph representing a map to determine a correction coefficient CD4.

It is also noted that target inter-vehicle distance $L^*(t)$ of the inter-vehicle distance command value calculating block 110 may be enlarged in place of the modification of specific angular frequency $\zeta_{nDB}$ of the inter-vehicle related feedback system. Specifically, inter-vehicle distance command value calculating block 110 may receive the external disturbance value $d_V(t)$ calculated by drive torque command value calculating block 530 of vehicular velocity controlling block 500, may estimate road surface gradient $\phi_A(t)$ according to the map shown in FIG. 7 from external disturbance value, determines correction coefficient $C_{D4}$ (>1) from a map shown in FIG. 9, and may calculate target inter-vehicle distance $L^*(t)$ at the inter-vehicle distance command value determining section 112 shown in FIG. 2 by the correction coefficient $C_{D4}$.

That is to say, $$L^*(t) = [V_A(t) + \Delta V(t)] \cdot d_T \cdot C_{D4}.$$

In this case, since as the external disturbance value $d_V(t)$ representing the gradient angle of the road surface becomes larger, $C_{D4}$ becomes larger and target inter-vehicle distance $L^*(t)$ becomes large. Hence, a start of deceleration becomes earlier.

As described above, the values of each or either of the correction coefficients $C_{D3}$ or $C_{D4}$ are set in accordance with the external disturbance value of $d_V(t)$ representing the road surface gradient angle. Hence, in a case where the control toward the acceleration direction is carried out according to the deviation of the external disturbance from the normal dynamic characteristic of the object to be controlled (host vehicle) during the vehicular run on the ascending slope, the feedback response characteristic is increased or the target inter-vehicle distance is set to be larger. Thus, if the host vehicle has reached to the set inter-vehicle distance, a speedily deceleration or the earlier deceleration start occurs. Consequently, even if the host vehicle is running on the ascending slope, the start of deceleration cannot be delayed. In addition, since the road surface gradient angle is calculated from the external disturbance value $d_V(t)$, no additional sensor to detect the road surface gradient is needed.

Next, the vehicular velocity controlling block 500 will be described with a chief reference of FIG. 10.

First, suppose that a system switch (not shown) is turned on. At this time, a power supply of the whole system is turned on so that the system is a stand-by state. In this state, if a set switch 20 is turned to ON, the control is initiated.

The vehicular velocity controlling block 500 (a portion enclosed by a broken line) is constituted by a microcomputer in the preferred embodiment in the same manner as the inter-vehicle distance controlling block 105 shown in FIG. 1A. However, a single chip microcomputer with the inter-vehicle distance controlling block 105 may be installed together.

Within the vehicular velocity controlling block 500, vehicular velocity command value determining block 510 calculates vehicular velocity command value $V_{com}(t)$ for each control period of 10 milliseconds.

Vehicular velocity command maximum setting block 520 sets the vehicular velocity $V_A(t)$ when set switch 20 is pressed (operated) as a vehicular velocity command maximum value $V_{SMAX}$ (target vehicular velocity).

After the vehicular velocity command maximum value $V_{SMAX}$ is set through set switch 20, whenever a coast switch 30 is pressed once, a vehicular velocity command maximum value setting section 520 sets the vehicular velocity command maximum value $V_{SMAX}$ to a lower value in a stepwise manner by a unit of 5 Km/h.

That is to say, if coast switch 30 is pressed by an n number of times, the value of $V_{SMAX}$ is set to a lower value by, e.g., n×5 (Km/h) (if continued to be pressed, suppose that a time duration during which the switch is continued to be pressed is T and, for example, this case is T/1(second)×5 Km/h.

After vehicular velocity command maximum value $V_{SMAX}$ to a higher value in the stepwise manner by a unit of 5 Km/h.

Whenever n number of times accelerate switch 40 is pressed once after the set of $V_{SMAX}$ by set switch 20, vehicular velocity command maximum value setting block 520 sets $V_{SMAX}$ in the stepwise manner by the unit of 5 Km/h to a high value.

That is to say, whenever n number of times switch 40 is pressed, $V_{SMAX}$ is set to the higher value by n×5 Km/h (or, for example, T/1 (second)×5 Km/h if pressed continuously).

Next, lateral G dependent vehicular velocity correction quantity calculating block 580 receives steering angle θ(t) of a steering wheel outputted from a steering angle sensor 100 and vehicular velocity $V_A$(t) and calculates a vehicular velocity correction quantity $V_{SUB}$(t) to correct a vehicular velocity command value as will be described later in accordance with a lateral acceleration (hereinafter, referred to as a lateral G).

Figure 11:
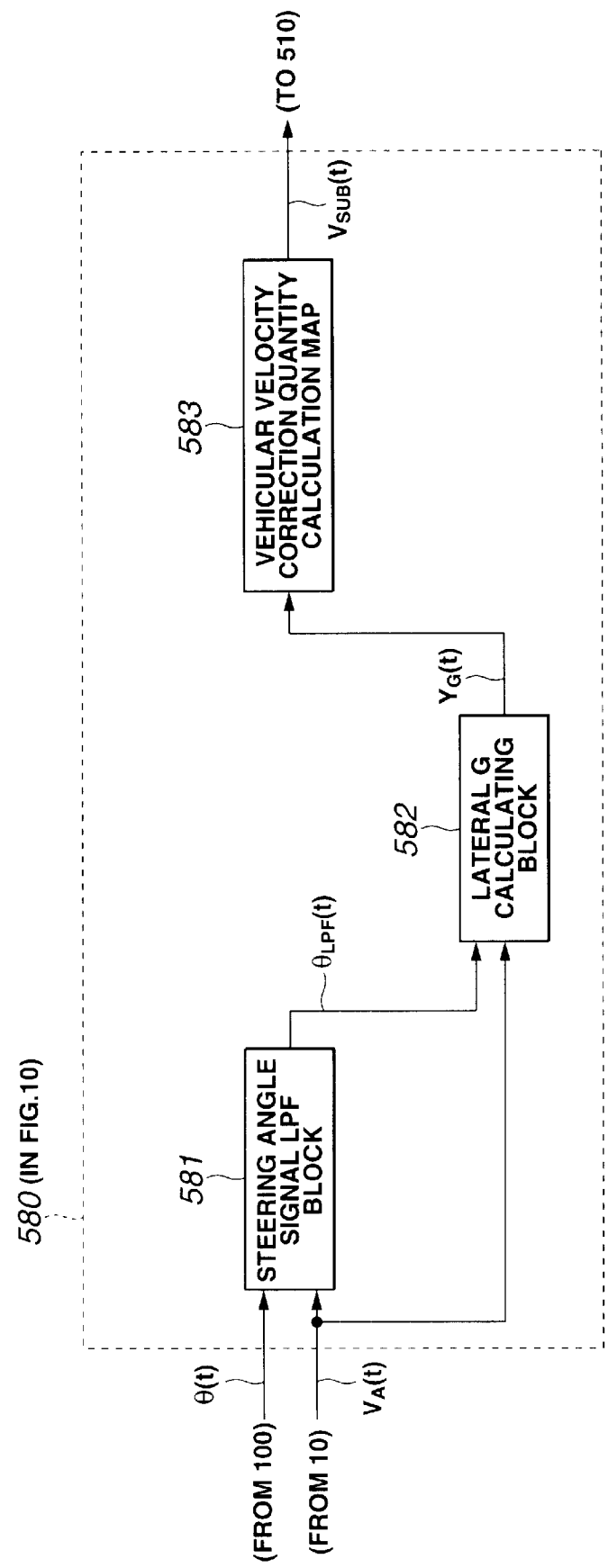
FIG. 11 is a functional block diagram of a lateral G dependent vehicular velocity correction quantity calculating block shown in FIG. 10.

The lateral G dependent vehicular velocity correction quantity calculating block 580, specifically as shown in FIG. 11, includes a steering angle signal low-pass filter LPF (hereinafter, called steering angle signal LPF block), a lateral G calculating block 582, and a vehicular velocity correction quantity calculating block 583.

First, steering angle signal LPF block 581 calculates a steering angle LPF value $\theta_{LPF}$(t) according to inputted vehicular velocity $V_A$(t) and steering angle θ(t).

That is to say, $$\theta_{LPF}(t)=\theta(t)/(TSTR \cdot s+1).$$

Figure 12:
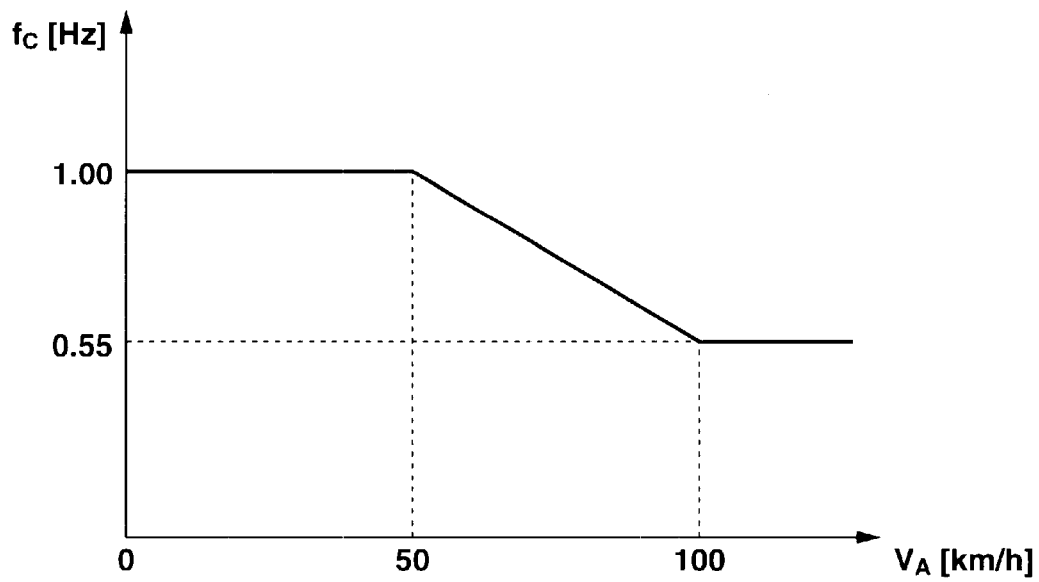
FIG. 12 is a characteristic graph representing a relationship between a host vehicular velocity $V_A$ and a cut-off frequency fc of a low-pass filter.

In the equation described above, TSTR denotes a time constant of LPF (=½π·fc) and a cut-off frequency fc of LPF is determined from a map shown in FIG. 12 representing a relationship between the cut-off frequency and vehicular velocity $V_A$(t). This map of FIG. 12 indicates that as the vehicular velocity $V_A$(t) becomes higher (falls in a high velocity range), the cut-off frequency fc becomes lower. For example, fc at 50 Km/h is higher than that at 100 Km/h.

The lateral G calculating block 582 receives steering angle LPF value $\theta_{LPF}$(t) and vehicular velocity $V_A$(t) and calculates lateral G value $Y_G$(t) in accordance with the following equation;

$$Y_G(t)=\{V_A(t)^2 \cdot \theta_{LPF}(t)\}/\{N \cdot W \cdot [1+A \cdot V_A(t)]\}$$

In this respect, W denotes a wheel base of the vehicle, N denotes a steering gear ratio, and A denotes a stability factor.

It is noted that the above-described equation indicates a case where the lateral G is detected from the vehicular steering angle but the lateral G may be detected through the low pass filtering to yaw rate ψ(t) using a yaw rate (yaw velocity) sensor. In the latter case, use is made of the following equations.

$$Y_G(t)=V_A(t) \cdot \psi_{LPF};$$

and $$\psi_{LPF}=\psi(t)/(T_{YAW} \cdot s+1)$$

in this equation, $T_{YAW}$ denotes a time constant of the low pass filter for the yaw rate and as the vehicular velocity VA(t) becomes larger (higher), $T_{YAW}$ is varied to be a larger value.

Vehicular velocity correction quantity $V_{SUB}$(t) is calculated by multiplying a correction coefficient determined by a lateral G with a predetermined vehicular velocity command value variation rate limitation value [for example, 0.021 (Km/h)/10(millisecond)=0.06G].

It is noted that a value of the above-described vehicular velocity command value variation rate limitation value is equal to a maximum value of a vehicular velocity command value variation rate $\Delta V_{COM}$(t) shown in FIG. 15 described later.

$$V_{SUB}(t)=\text{correction coefficient} \times 0.021 \text{ (Km/h)}/10 \text{ (milliseconds)}.$$

As will be described later, in order to calculate a vehicular velocity command value $V_{COM}$(t) which is a value to control the vehicular velocity finally, vehicular velocity correction quantity $V_{SUB}$(t) is to be included as a subtraction term. Hence, as vehicular velocity correction quantity $V_{SUB}$(t) becomes larger, the vehicular velocity command value $V_{COM}$(t) is more limited.

Figure 13:
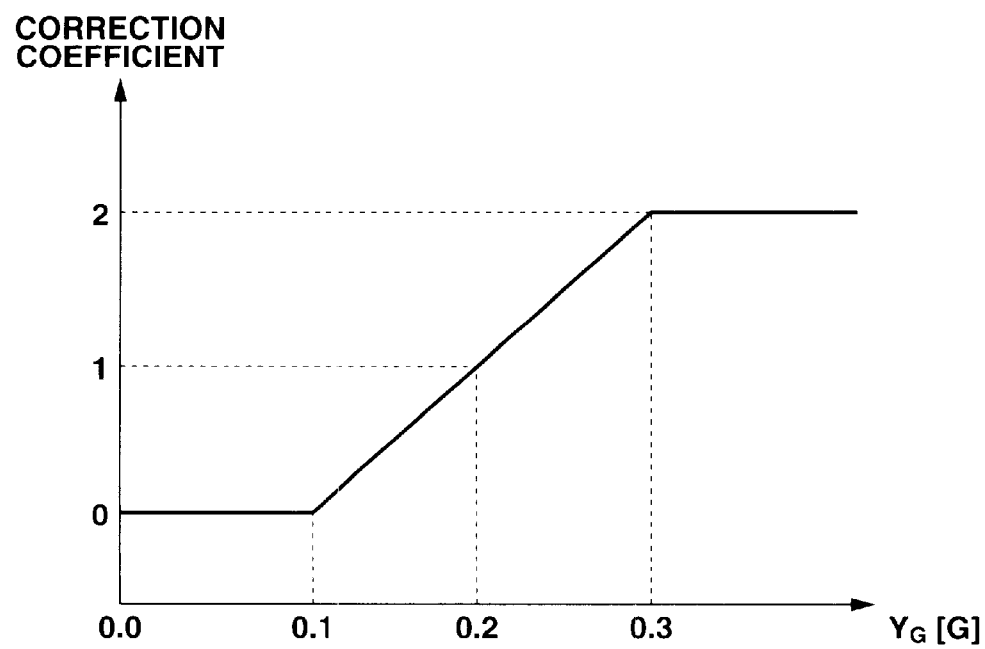
FIG. 13 is a characteristic graph representing a relationship between a correction coefficient to calculate a vehicular velocity correction quantity $V_{SUB}(t)$ and a value of a lateral G $Y_G(t)$.

The correction coefficient becomes large as the lateral G value $Y_G$(t) becomes larger as shown in FIG. 13.

This is because as the lateral G becomes large, there is a large limitation on a variation in the vehicular velocity command value $V_{COM}$(t).

However, as shown in FIG. 13, in a case where the lateral G is equal to or lower than 0.1 G as shown in FIG. 13, the correction coefficient is zeroed determining that no correction is needed for the vehicular velocity command value. In addition, if the lateral G is equal to or larger than 0.3 G, the correction coefficient is set to a constant value (for example, 2) in order to prevent an excessive correction in a case where the lateral G detected value is erroneously large and since in a normal driving no such a large lateral G as described above is developed.

As will be described later in vehicular velocity command value determining block 510, the above-described accelerate switch operation causes the target vehicular velocity to be raised, viz., the acceleration is requested, vehicular velocity command value variation rate $\Delta V_{COM}$(t) is added to the present vehicular velocity value $V_A$(t) from which the vehicular velocity correction value $V_{SUB}$(t) is subtracted to calculate the final vehicular velocity (controlling) command value $V_{COM}$(t). Hence, if the vehicular velocity command value variation rate $\Delta V_{COM}$(t) is larger than the vehicular velocity correction value, the vehicle is accelerated but if $\Delta V_{COM}$(t) is smaller than vehicular velocity correction value $V_{SUB}$(t), the vehicle is decelerated. As described above, the vehicular velocity correction value $V_{SUB}$(t) is derived by multiplying the correction coefficient as shown in FIG. 13 with the vehicular velocity command value variation rate limitation value (maximum value of the vehicular velocity command value variation rate). Hence, for example, if vehicular velocity command value variation rate limitation value=vehicular velocity command value variation rate, the present vehicular velocity is maintained since the acceleration value is balanced with the deceleration value when the correction coefficient is 1 ($Y_G$(t)=0.2 in the example of FIG., 13). In details, in this example, if the lateral G value $Y_G$(t) is smaller than 0.2, the host vehicle is accelerated but if, $Y_G$(T) is larger than 0.2, the host vehicle is decelerated. On the other hand, if the operation on the coast switch 30 causes the target vehicular velocity to be reduced, i.e., the deceleration is requested, the vehicular velocity command value $\Delta V_{COM}(t)$ and vehicular velocity correction value $V_{SUB}(t)$ are subtracted from the present vehicular velocity $V_A(t)$ to derive the vehicular velocity command value $V_{COM}(t)$. Hence, in this case, the host vehicle is always decelerated. A magnitude of deceleration becomes larger as the vehicular velocity correction value $V_{SUB}(t)$ becomes larger, that is to say, as the lateral G becomes larger. It is noted that the above-described value 0.021 (Km/h) /10 (milliseconds) for the vehicular velocity command value variation rate limitation value is a value presumed when the vehicle is running in a freeway.

As described above, the vehicular velocity correction value $V_{SUB}(t)$ is determined according to a product between the correction coefficient according to the lateral G and the vehicular velocity variation rate limitation value and the vehicular velocity is controlled so that the lateral G is prevented from being large with the value of subtraction term (vehicular velocity correction value) enlarged when the lateral G becomes large. However, as explained in the steering angle signal LPF block 581 shown in FIG. 11, the cut-off frequency fc is lowered as the vehicular velocity falls in the higher velocity range. Hence, the time constant TSTR of the LPF becomes large and steering angle LPF value $\theta_{LPF}(t)$ is made smaller so that the lateral G estimated by the lateral G calculating block 582 is accordingly small. As a result of this, the vehicular velocity correction value $V_{SUM}(t)$ derived via the vehicular velocity correction quantity calculating map 583 is small. Then, the correction from the steering angle to the vehicular velocity command value tends to become difficult to be incorporated (the correction in the direction of acceleration).

A detailed explanation in this respect will be made hereinbelow.

A characteristic of a specific angular frequency $\omega n_{STR}$ on a vehicle response to the steering angle will be described in the following equation:

That is to say, $$\omega n_{STR} = (2W/V_A)\sqrt{[Kf \cdot Kr \cdot (1 + A \cdot V_A^2)/m_V \cdot I]}$$

Wherein Kf and Kr denote front and rear tire wheel cornering power (for one wheel), W denotes a wheel base, mv denotes a vehicular weight, A denotes a stability factor, I denotes a vehicular yaw inertia moment.

Figure 14:
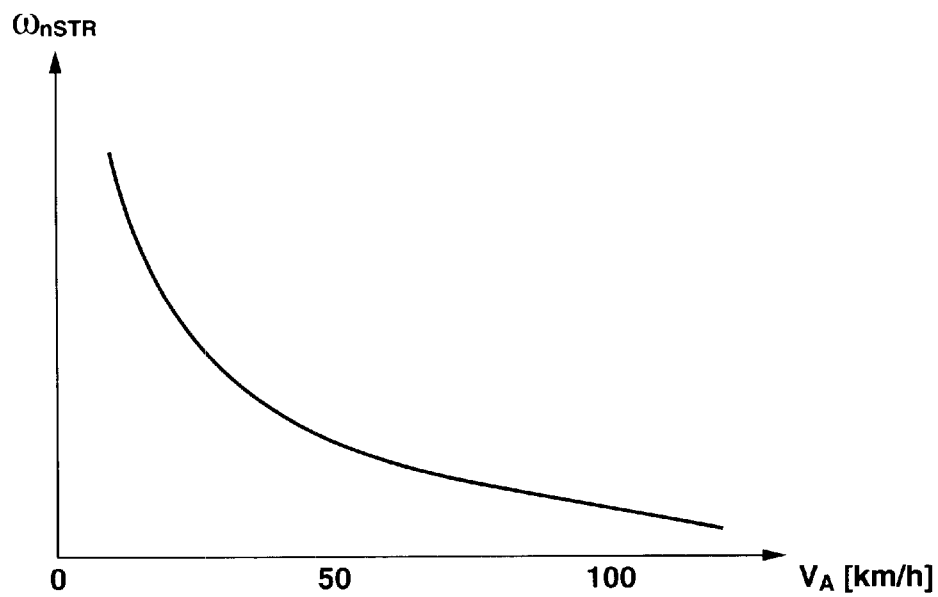
FIG. 14 is a characteristic graph representing a relationship between the specific angular frequency and the host vehicular velocity $V_A$.

The characteristic of the specific angular frequency $\omega n_{STR}$ is shown in FIG. 14.

As shown in FIG. 14, this characteristic is such that as the vehicular velocity is increased, specific angular frequency $\omega n_{STR}$ becomes reduced so that the vehicular response characteristic to the steering wheel becomes worsened. As the vehicular velocity becomes decreased, the specific angular frequency $\omega n_{STR}$ becomes higher and the vehicular response characteristic to the steering angle becomes favorable. In order words, as the vehicular velocity becomes higher, lateral G is not easy to be developed even when the vehicular steering wheel is operated. As the vehicular velocity becomes reduced, a slight steering operation causes the lateral G to be easy to be developed. Therefore, as shown in FIG. 12, the cut-off frequency fc is reduced as the vehicular velocity becomes increased so that the responsive characteristic is slowed not to be easy to apply the correction to the vehicular velocity command value.

Figure 10:
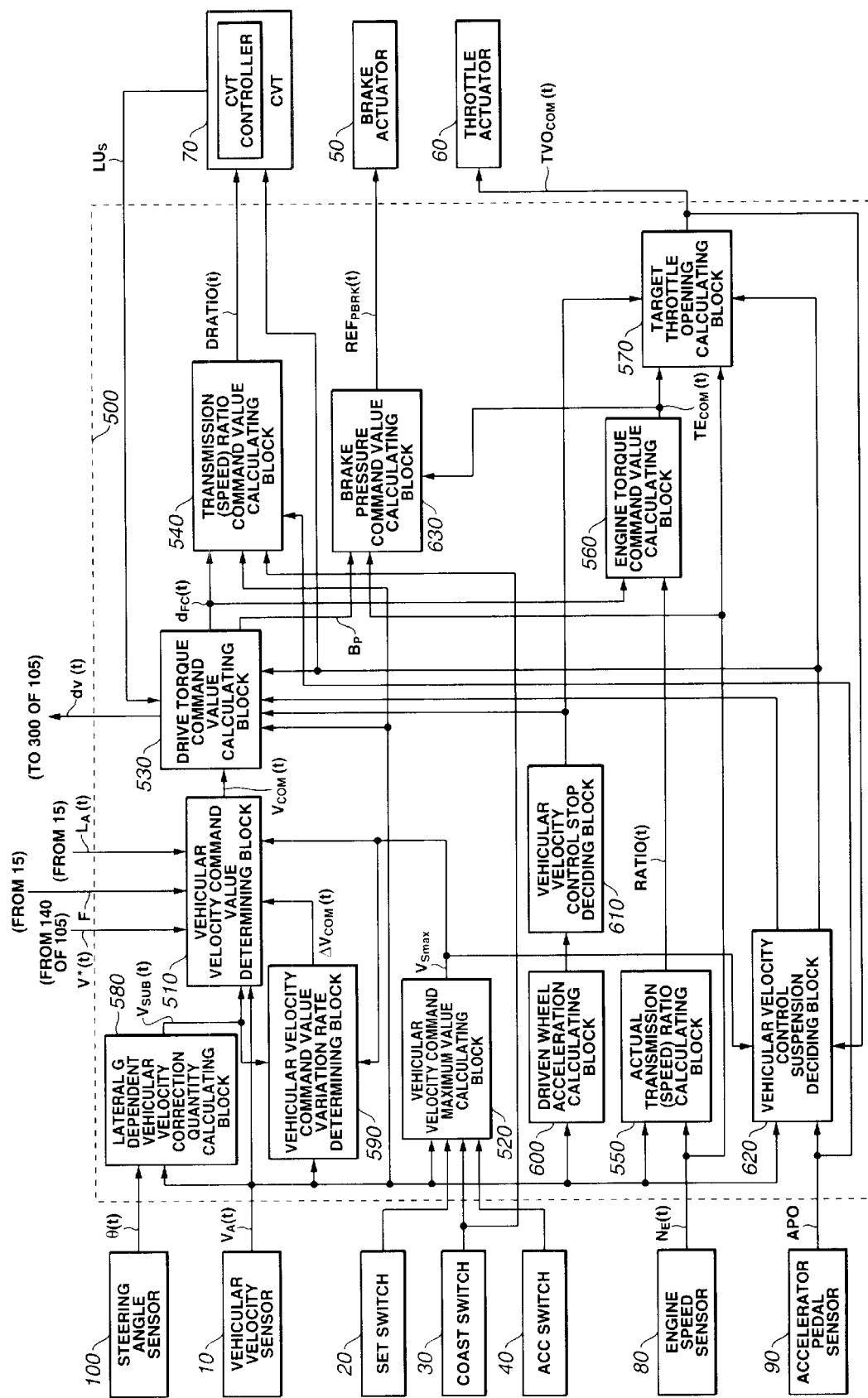
FIG. 10 is a functional block diagram of a whole vehicular velocity controlling block shown in FIG. 1A.
Figure 15:
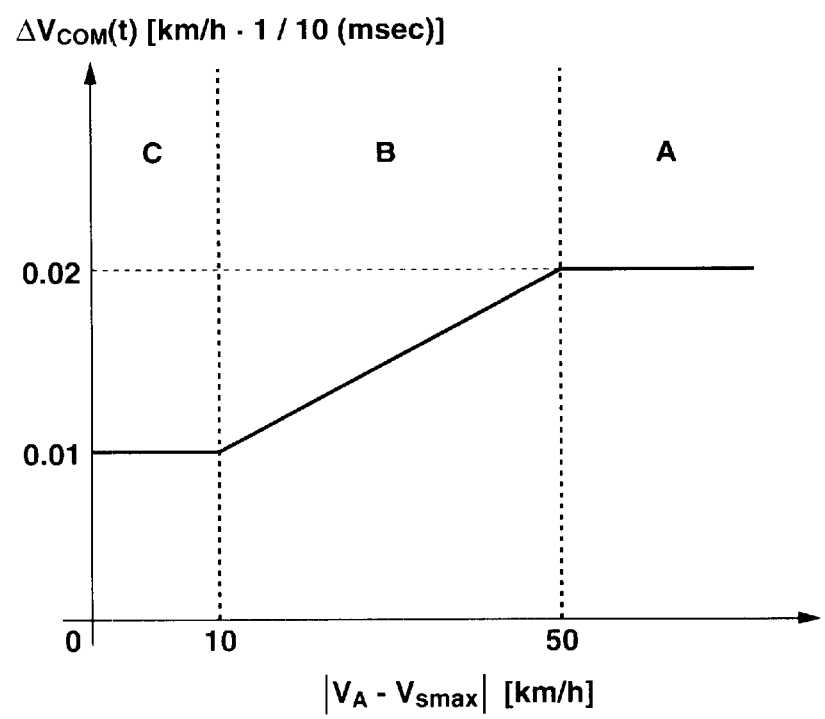
FIG. 15 a characteristic graph representing a relationship between an absolute value of a deviation between the host vehicular velocity $V_A(t)$ and a vehicular velocity command maximum value $V_{SMAX}$ and a vehicular velocity command value variation rate $\Delta_{VCOM}(t)$.

Next, a vehicular velocity command value variation rate determining block 590 shown in FIG. 10 calculates a vehicular velocity command value variation rate $\Delta V_{COM}(t)$ from a map shown in FIG. 15 on the basis of an absolute value of a deviation between vehicular velocity $V_A(t)$ and vehicular velocity maximum value $V_{SMAX}$.

The map shown in FIG. 15 represents that as the absolute value of the deviation ($|V_A - V_{AMAX}|$ becomes larger as vehicular velocity command value variation rate $\Delta V_{COM}(t)$ becomes larger to such a degree that $\Delta V_{COM}(t)$ does not exceed an acceleration control limitation value α as will be described in a vehicular velocity control stop deciding block 610 so that the vehicle velocity is increased or decreased (accelerated or decelerated) as speedily as possible (this occurs in a range B shown in FIG. 15).

Then, as the absolute value of the deviation becomes small, the vehicular velocity command value variation rate $\Delta V_{COM}(t)$ is made small to a degree that the driver's feeling of acceleration is not affected thereby to prevent vehicular velocity command maximum value $V_{SMAX}$ does not overshoot (in a range C in FIG. 15).

In a range A shown in FIG. 15, $\Delta V_{COM}(t)$ is set to be a constant value which does not exceed the acceleration limitation value α (for example, 0,06G) and in the range C in FIG. 15, $\Delta V_{COM}(t)$ is set to another constant value (for example, 0.03G).

Furthermore, the vehicular velocity command value variation rate determining block 590 monitors vehicular velocity correction value $V_{SUB}(t)$ outputted from lateral G dependent vehicular velocity correction quantity calculating block 580. If a value of vehicular velocity correction value $V_{SUB}(t)$ is varied from zero to once that other than zero and is again returned to zero, vehicular velocity command value variation rate determining block 590 determines that the host vehicle has ended a run on a curved road and detects whether the vehicular velocity $V_A(t)$ becomes equal to vehicular velocity command maximum value $V_{SMAX}$.

If determining that the host vehicle has ended the run of the curved road, vehicular velocity command value variation rate determining block 590 determines vehicular velocity command value variation rate $\Delta V_{COM}(t)$ from vehicular velocity $V_A(t)$ in place of determination of vehicular velocity command value variation rate $\Delta V_{COM}(t)$ using the map shown in FIG. 15 on the basis of the absolute value of deviation between vehicular velocity $V_A(t)$ and vehicular velocity command maximum value $V_{SMAX}$. In this case, the characteristic of $\Delta V_{COM}(t)$ uses that representing generally the same tendency as that shown in FIG. 15.

That is to say, a new map in which a lateral axis of FIG. 15 is replaced from $|V_A - V_{SMAX}|$ with vehicular velocity $V_A(t)$ is used. The new map is set such that as vehicular velocity $V_A(t)$ becomes small the vehicular velocity command value variation rate $\Delta V_{COM}(t)$ becomes small. This process using the new map is ended upon the determination that vehicular velocity $V_A(t)$ becomes equal to vehicular velocity command maximum value $V_{SMAX}$.

It is noted that, in place of the above example in which the determination of vehicular velocity command value variation rate $\Delta V_{COM}(t)$ from actual vehicular velocity $V_A(t)$ when the determination of the end of the curved road run, vehicular velocity command value variation rate determining block 590 may determine that the vehicular curved run is started when vehicular velocity correction value $V_{SUB}(t)$ becomes the value other than zero, may previously store the instantaneous vehicular velocity $V_A($ start) in a memory location, and may determine vehicular velocity command value variation rate $\Delta V_{COM}(t)$ from a magnitude of a difference $\Delta V_A = V_A(\text{start}) - V_A(\text{end})$ (namely, a vehicular velocity drop quantity due to the correction of the vehicular velocity command value). The used characteristic at this time is a characteristic representing an inverse tendency.

That is to say, a new map is such that the lateral axis of FIG. 15 is replaced from $|V_A-V_{SMAX}|$ to the vehicular velocity difference $\Delta V_A$ and, as vehicular velocity difference $\Delta V_A$ becomes large, vehicular velocity command value variation rate $\Delta V_{COM}(t)$ is set to a smaller value. This process is continued until vehicular velocity $V_A(t)$ is made equal to vehicular velocity command maximum value $V_{SMAX}$.

Since the vehicular velocity command value is corrected so that the lateral G value does not indicate an excessive value during the vehicular run on the curved road, the vehicular velocity is generally reduced. Therefore, as described above, vehicular velocity command value variation rate determining block 590 is so structured that, after the curved road run has been ended and the vehicular velocity has dropped, vehicular velocity command value variation rate $\Delta V_{COM}(t)$ is modified in accordance with vehicular velocity $V_A(t)$ at the end of the curved road run or vehicular velocity difference $\Delta V_A$ between those start of the curved road run and end thereof (namely, before and after the vehicular velocity drops due to the correction made for the vehicular velocity command value).

It is estimated that in a case where the vehicular velocity is low when the curved road run is ended or in a case where the vehicular velocity difference $\Delta V_A$ is large, the vehicular velocity has dropped due to a small radius of curvature of the curved road on which the host vehicle has run (tight corner). Then, there is a great possibility that the above-described situation is resulted when the host vehicle is running on a continued curved road such as a letter-S curve (or hairpin curve). Therefore, vehicular velocity command value variation rate $\Delta V_{COM}(t)$ is made small, in the case where the vehicular velocity is low when the curved road run is ended or in the case where the vehicular velocity difference $\Delta V_A$ is large, so that the acceleration during the active vehicular velocity control by means of the vehicular velocity command value is made small. Thus, the large acceleration for each turn of the curved road is not carried out when the host vehicle is running on the continued letter S shaped curved road.

Similarly, in a case where the vehicular velocity is high when the curved road run is ended or in a case where the vehicular velocity difference $\Delta V_A$ is small, vehicular velocity command value variation rate determining block 590 determines that the curved road on which the host vehicle is running is a single curved road and enlarges vehicular velocity command value variation rate $\Delta V_{COM}(t)$. This causes an immediate acceleration upon the end of the single curved road run to be carried out so that there is no possibility that the acceleration becomes dull and the vehicular driver gives an insufficient feeling.

As described above, vehicular velocity command value variation rate determining block 590 is so structured that vehicular velocity command value variation rate $\Delta V_{COM}(t)$ is enlarged (made large) in the case where the deviation between actual vehicular velocity $V_A(t)$ and post-modification set vehicular velocity (in the case described above, corresponds to vehicular velocity command maximum value $V_{SMAX}$) is large, as shown in the map of FIG. 15.

Therefore, in a case where the host vehicle is following the preceding vehicle on the basis of the output signal from inter-vehicle distance controlling block 105 shown in FIG. 1A and is running under a situation wherein the set vehicular velocity in the inter-vehicle distance control is different from the actual vehicular velocity, vehicular velocity command value variation rate $\Delta V_{COM}(t)$ is set in accordance with the deviation between the modified set vehicular velocity and the actual vehicular velocity.

In details, the vehicular velocity is varied according to a small vehicular velocity command value variation rate $\Delta V_{COM}(t)$ (acceleration or deceleration) in a case where the deviation between actual vehicular velocity VA(t) and post-modification (after modification) set vehicular velocity is small even if the set vehicular velocity before and after the modification is remarkably differed. Hence, this variation in the vehicular velocity can be matched with the driver's drive feeling in a case where the driver has demanded that the vehicular velocity is slightly reduced. In addition, the vehicular velocity is varied at the large vehicular velocity variation rate in a case where the deviation between the actual vehicular velocity and the set vehicular velocity is large. Hence, the vehicular velocity can speedily be converged to the new set vehicular velocity after the modification. For example, such a control that is in conformity to the driver's drive feeling such as to desire for the vehicular velocity to be largely decreased can be achieved.

Next, referring back to FIG. 10, a vehicular velocity command value determining block 510 calculates vehicular velocity command value $V_{COM}(t)$ in the following way, receiving vehicular velocity $V_A(t)$, vehicular velocity correction value $V_{SUB}(t)$, vehicular velocity command value variation rate $\Delta V_{COM}(t)$, and vehicular velocity command maximum value $V_{SMAX}$.

(1) A case where vehicular velocity command maximum value $V_{SMAX}$ is larger than vehicular velocity $V_A(t)$, i.e., the acceleration request through the operation of accelerate switch 40 (or resume switch) occurs.

That is to say, $$V_{COM}(t)=\min[V_{SMAX}, V_A(t)+\Delta V_{COM}(t)-V_{SUB}(t)].$$

In other words, vehicular velocity command value $V_{COM}(t)$ is determined through a selection from one of $V_{SMAX}$ and a value of $V_A(t)+\Delta V_{COM}(t)-V_{SUB}(t)$ which is smaller than the other.

(2) A case where $V_{SMAX}=V_A(t)$, i.e., the vehicular velocity is maintained at a constant velocity.

In this case, $$V_{COM}(t)=V_{SMAX}-V_{SUB}(t).$$

In other words, vehicular velocity $V_{COM}(t)$ is determined to be a subtraction result of vehicular velocity command maximum value $V_{SMAX}$ from vehicular velocity correction value $V_{SUB}(t)$.

(3) A case where vehicular velocity command maximum value $V_{SMAX}$ is smaller than vehicular velocity $V_A(t)$, i.e., a deceleration request through an operation of coast switch 30 occurs.

In this case, $$V_{COM}(t)=\max[V_{SMAX}, V_A(t)-\Delta V_{COM}(t)-V_{SUB}(t)].$$

In other words, vehicular velocity command value $V_{COM}(t)$ is determined through a selection from one of $V_{SMAX}$ and a value of $V_A(t)-\Delta V_{COM}(t)-V_{SUB}(t)$ which is larger than the other.

It is, however, noted that vehicular velocity command value determining block 510 inputs inter-vehicle related controlling vehicular velocity command value V*(t) from inter-vehicle distance controlling block 105 and preceding flag F from inter-vehicle distance sensor 15 and performs a process as described below.

(4) A case where preceding flag F is received.

If preceding flag F (it is noted that this flag F indicates that the preceding vehicle is present) is received, vehicular velocity command value determining block 510 compares inter-vehicle related controlling vehicular velocity command value L*(t) with vehicular velocity command maximum value $V_{SMAX}$, selects one of these two compared values which is smaller than the other as a $V_{CO}(t)$, and calculates $V_{COM}(t)$ using the following equation.

That is to say, $$V_{COM}(t)=V_{CO}(t)-V_{SUB}(t).$$

As described above, vehicular velocity command value determining block 510 determines vehicular velocity command value $V_{COM}(t)$ and controls the vehicular velocity in accordance with the determined vehicular velocity command value $V_{COM}(t)$.

Next, a drive torque command value calculating block 530 receives vehicular velocity command value $V_{COM}(t)$ and vehicular velocity $V_A(t)$ and calculates a drive torque command value $D_{FC}(t)$ in the following way.

Figure 16:
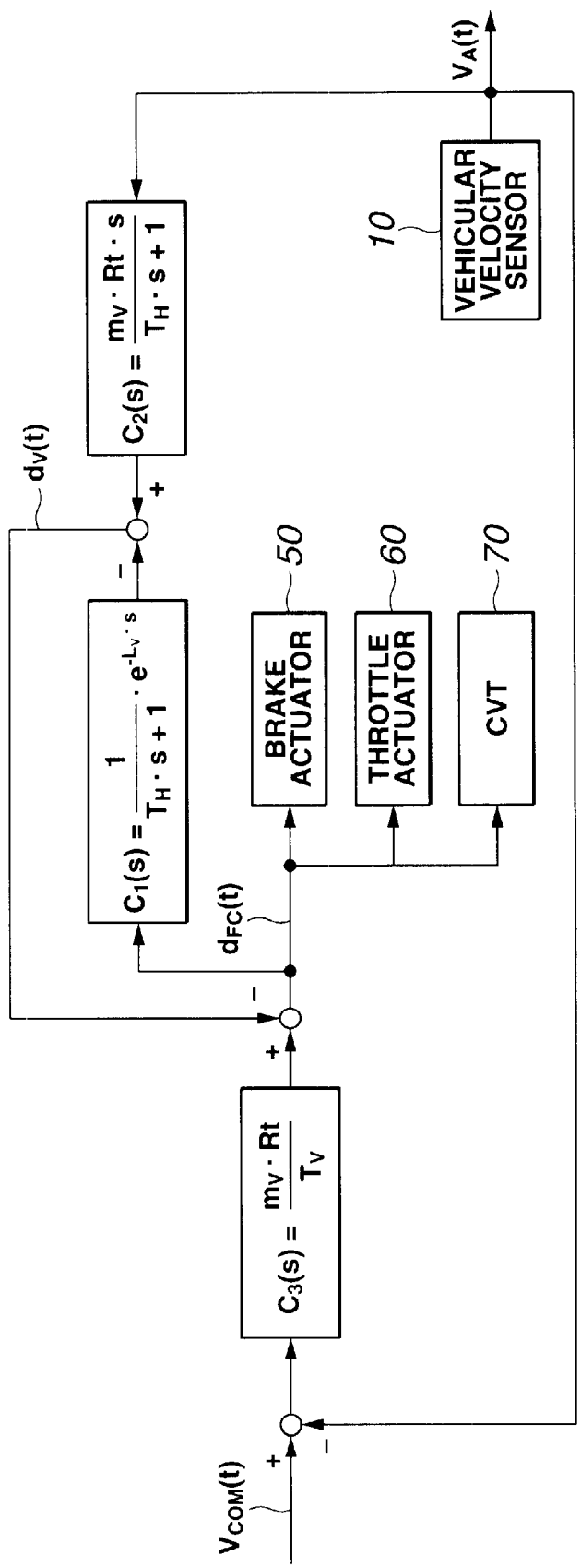
FIG. 16 is a functional block diagram of a drive torque command value calculating block shown in FIG. 10.

FIG. 16 shows an example of an internal block of drive torque command value calculating block 530.

A transfer characteristic Gv(s) with vehicular velocity command value $V_{COM}(t)$ being an input and vehicular velocity $V_A(t)$ being an output and can be expressed in the following equation.

Namely, $$Gv(s)=1/(Tv \cdot s+1) \cdot e^{(-Lv \cdot s)}$$

In the above equation, Tv denotes a first order lag time constant and Lv denotes the dead time due to the lag in a vehicular power train system.

In addition, a vehicle model of an object to be controlled is modeled with a drive torque command value $d_{FC}(t)$ as a manipulated variable and vehicular velocity $V_A(t)$ as a controlled variable so that a motion of the power train of the vehicle can be expressed in a simple linear model which is described below.

Namely, $$V_A(t)=1/(m_V \cdot Rt \cdot s)e^{(-Lv \cdot s)} \cdot d_{FC}(t).$$

In the above equation, Rt denotes a tire effective revolution radius and mv denotes a vehicular mass.

Since the vehicular model with drive torque command value $d_{FC}(t)$ being input and vehicular velocity $V_A(t)$ being output is in a form of 1/s, the vehicular model consequently has an integration characteristic.

It is noted that if the response characteristic of the object to be controlled in the case where the vehicular velocity $V_A(t)$ is the output and the vehicular velocity $V_A(t)$ is the input is made coincident with the characteristic of transfer characteristic Gv(s) having elements of the predetermined first order lag Tv and dead time Lv, the following can be defined using $C_1(s)$, $C_2(s)$, and $C_3(s)$. It is also noted that $C_1(s)$ denotes an external disturbance estimator determined by means of an approximation zeroing technique, $C_2(s)$ denotes another external disturbance estimator determined by means of the approximation zeroing technique, these estimators being compensators acted to suppress an influence caused by an external disturbance and a modeling error, and $C_3(s)$ denotes a compensator determined by means of a model matching technique.

Compensator $C_1(s)=e^{(-Lv \cdot s)}/(T_H \cdot s+1)$;

and

Compensator $C_2(s)=(m_V \cdot Rt \cdot s)/(T_H \cdot s+1)$.

At this time, external disturbance estimation value $d_V(t)$ is given as follows:

$$d_V(t)=C_2(s) \cdot V_A(t)-C_1(s) \cdot d_{FC}(t).$$

In addition, suppose that the dead time of the object to be controlled is neglected and a normal model Gv(s) is a first order low pass filter of the time constant Tv. Compensator $C_3$ (s) is the constant described in the following:

Compensator $C_3(s)=m_V \cdot Rt/Tv$

The drive torque command value $d_{FC}(t)$ is calculated and determined in the following equation by means of the three compensators $C_1(s)$, $C_2(s)$, and $C_3(s)$.

That is to say, $$d_{FC}(t)=C_3(s) \cdot \{V_{COM}(t)-V_A(t)\}-\{C_2(s) \cdot V_A(t)-C_1(s) \cdot d_{FC}(t)\}.$$

The drive torque is controlled on the basis of drive torque command value $d_{FC}(t)$.

Figure 17:
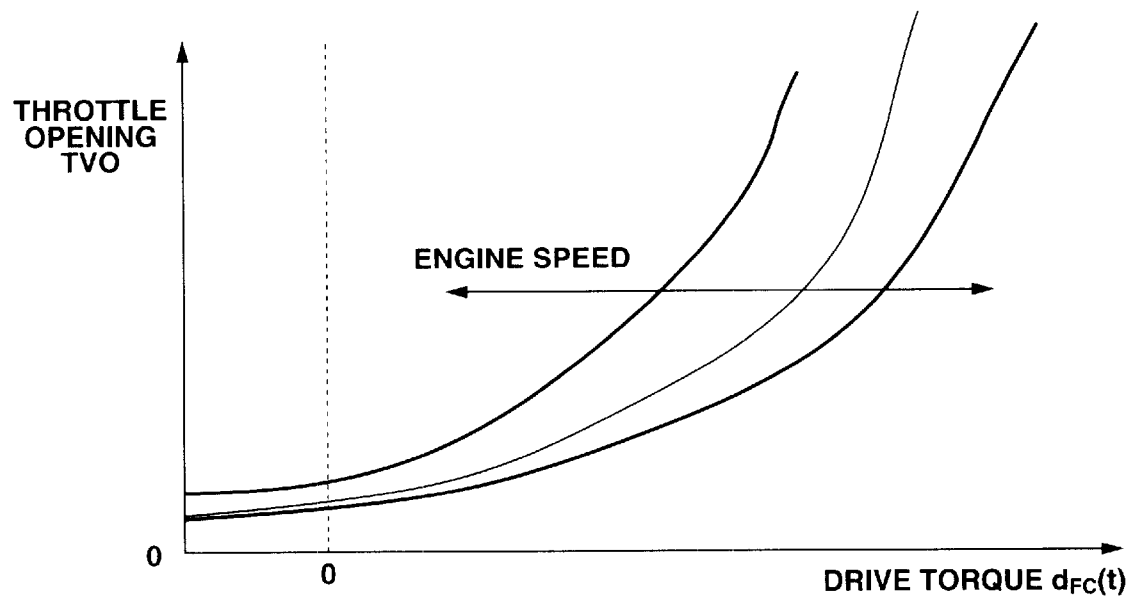
FIG. 17 is a characteristic graph representing one example of an engine non-linear steady state characteristic.

In details, drive torque command value calculating block 530 calculates throttle opening command value which coincides an actual drive torque $d_{FA}(t)$ with drive torque command value $d_{FC}(t)$ using a map representing an engine non-linear steady characteristic previously measured as shown in FIG. 17 and distributes $d_{FC}(t)$ to a vehicular transmission system or brake system to compensate for an insufficient negative engine drive torque if the engine negative torque is insufficient. In this way, the control for the throttle valve opening angle, a continuously variable transmission, and brake system permits a linearization of the engine non-linear steady characteristic.

It is noted that in a case where the continuously variable transmission 70 is provided with a fluid converter with a lock up mechanism equipped, a lock up state signal LUs is inputted from a controller of the continuously variable transmission 70 and the drive torque command value calculating block 530 determines if the converter is in the lock up state and, in the case of the lock up state determination, enlarges the time constant $T_H$ (this time constant is described in each denominator of $C_1(s)$, $C_2(s)$, and $C_3(s)$ in FIG. 16). Thus, the vehicular velocity control feedback correction quantity (a correction coefficient of a feedback loop to maintain a desired response characteristic) becomes small so that the response characteristic is made conformity to that characteristic of the object to be controlled which delays at the time of an un-lock up state as compared with the lock up state. Hence, a stability of the vehicular velocity control system can be assured at each of both times of the lock up state and of the un-lock up state.

Figure 21:
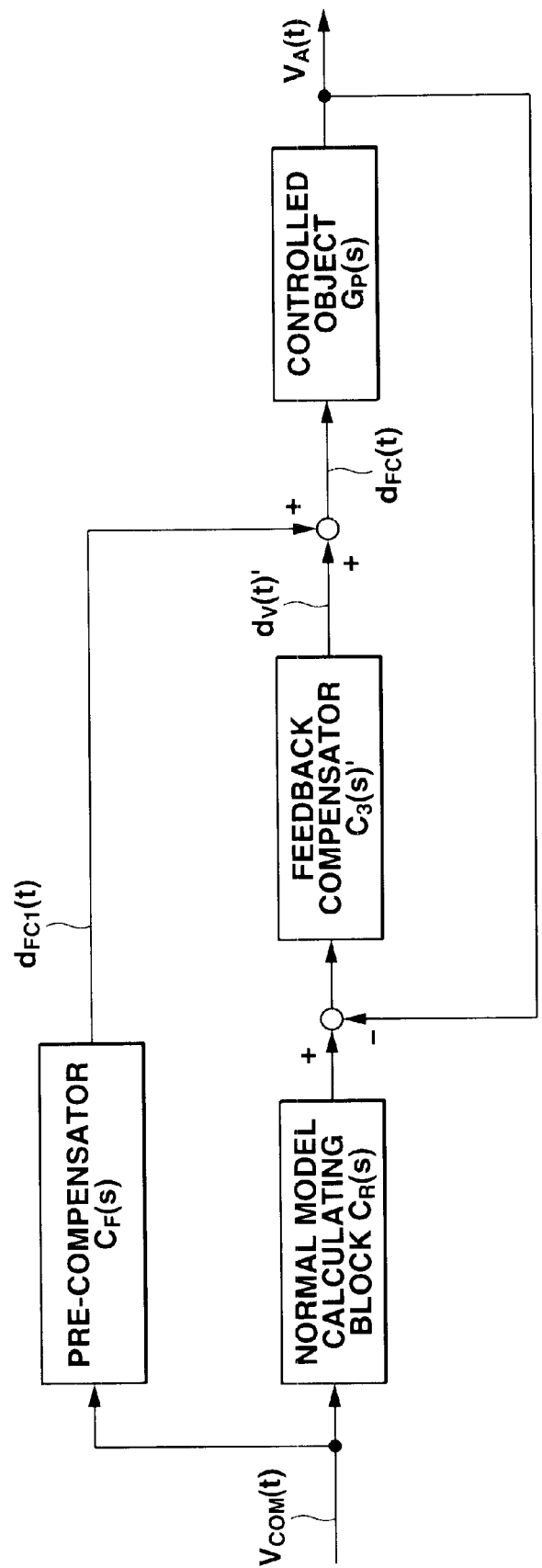
FIG. 21 is a functional block diagram of another example of a drive torque command value calculating block shown in FIG. 16.

Although FIG. 16 shows drive torque command value calculating block 530 including compensators $C_1(s)$ and $C_2(s)$ to compensate for the transfer characteristic of the object to be controlled and $C_3(s)$ to achieve the response characteristic that the designer defines, FIG. 21 shows an alternative of drive torque command value calculating block 530 including a pre-compensator $C_F(s)$ to compensate to give an arbitrary response characteristic defined by the designer, a normal model calculating block $C_R(s)'$ to calculate the arbitrary response characteristic defined by the designer, and a feedback compensator $C_3(s)'$ to compensate for a deviation from the response characteristic of normal model calculating block $C_R(s)$.

In details, in FIG. 21, pre-compensator $C_F(s)$ calculates a reference drive torque command value $d_{FC1}(t)$ using a filter defined in the following equation in order to achieve a transfer function Gv(s) of actual vehicular velocity $V_A(t)$ with respect to vehicular velocity command value $V_{COM}(t)$.

Namely, $$d_{FC1}(t)=m_V \cdot R_T \cdot V_{COM}(t)/(Tv \cdot s+1).$$

The normal model calculating block $C_R(s)$ calculates a target response $V_T(t)$ from transfer function Gv(s) and vehicular velocity command value $V_{COM}(t)$.

That is to say, $$V_T(t)=Gv(s)\cdot V_{COM}(t).$$

Feedback compensator $C_3(s)'$ calculates a drive torque command value correction quantity $d_V(t)'$ so as to eliminate such a deviation as that between target response $V_T(t)$ and actual vehicular velocity $V_A(t)$ if this deviation occurs.

That is to say, drive torque command value correction quantity $d_V(t)'$ is expressed in the following equation.

Namely, $$d_V(t)'=[(Kp\cdot s+K_I)/s][V_T(t)-V_A(t)].$$

In the above equation, Kp denotes a proportional gain of feedback compensator $C_3(s)'$ and $K_I$ denotes an integration control gain of feedback compensator $C_3(s)'$.

It is noted that drive torque command value correction quantity $d_V(t)'$ corresponds to external disturbance estimated value $d_V(t)$ described above with reference to FIG. 16.

If drive torque command value correction quantity calculating block shown in FIG. 21 determines that the un-lockup state occurs according to the lock-up state signal LUs, this block calculates correction quantity $d_V(t)'$.

That is to say, $$d_V(t)'=[(K_P'\cdot s+K_I')/s][V_T(t)-V_A(t)].$$

In the above equation, $K_P'<K_P$ and $K_I'<K_I$.

Hence, drive torque command value $d_{FC}(t)$ is calculated from reference drive torque command value $d_{FC1}(t)$ and drive torque command value correction quantity $d_V(t)'$ as follows:

Namely, $$d_{FC}(t)=d_{FC1}(t)+d_V(t)'.$$

Since the feedback gain is made small during the un-lockup time as compared with the lock-up time, a variation rate of the drive torque command value correction quantity is made small. Since the response characteristic can be conformed to that of the response characteristic of the object to be controlled delayed during the un-lock up state as compared with the lock-up state, the stability of the vehicular velocity control system during each of both times of the lock up state and un-lock up state can be assured.

Next, an actuator drive system shown in FIG. 10 will be described below.

A transmission (gear) ratio command value calculating block 540 inputs drive torque command value $d_{FC}(t)$, vehicular velocity $V_A(t)$, and output of coast switch 30, and output of an accelerator pedal sensor 90, calculates a transmission (gear) ratio command value (CVT speed ratio command value) DRATIO(t), and outputs the calculated gear ratio command value DRATIO(t) to the continuously variable transmission (CVT) 70.

(1) A case where coast switch 30 is in an off state.

Figure 18:
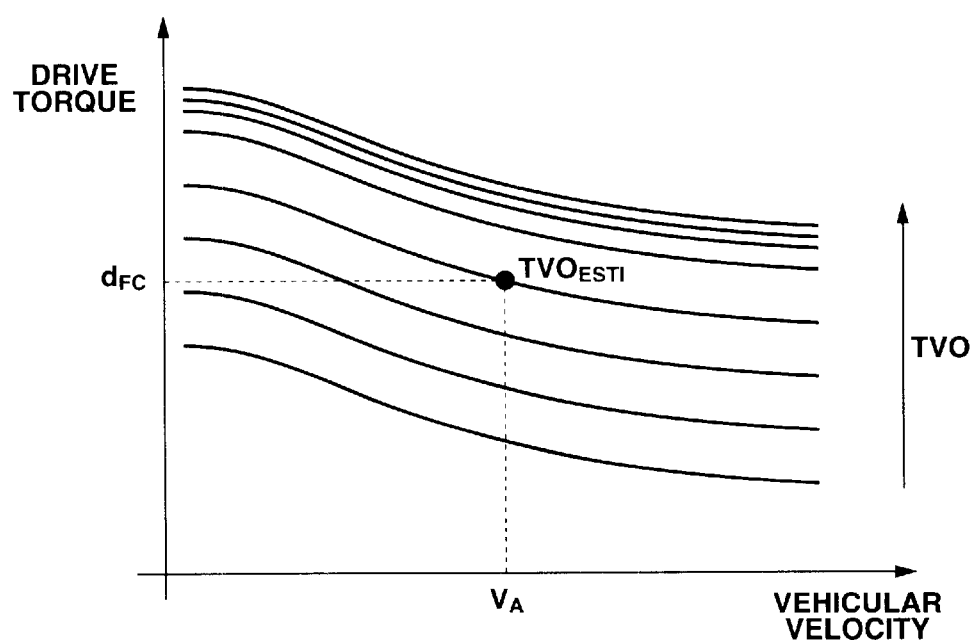
FIG. 18 is a characteristic graph representing one example of a throttle opening estimation map.

In this case, transmission (gear) ratio command value calculating block 540 calculates throttle opening angle estimated value $TVO_{EST1}$ from a throttle valve opening angle estimation map as shown in FIG. 18 on the basis of the vehicular velocity $V_A(t)$ and drive torque command value $d_{FC}(t)$.

Figure 19:
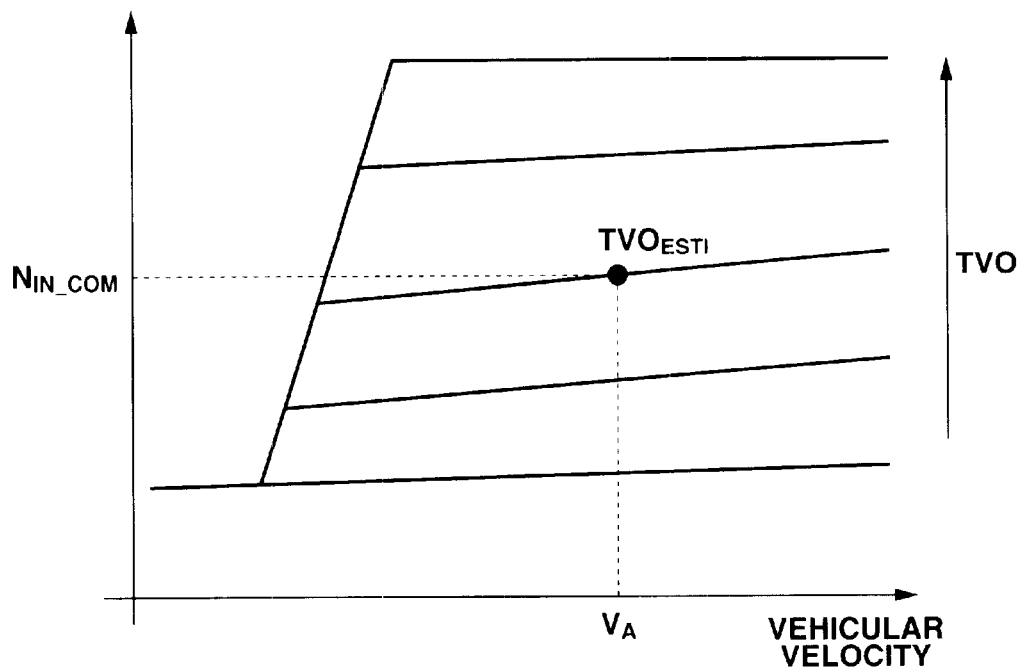
FIG. 19 is a characteristic graph representing one example of a CVT speed ratio (also called, transmission ratio or gear ratio).

Then, transmission (gear) ratio command value calculating block 540 calculates an engine revolution speed command value $N_{IN\_COM}$ from a CVT transmission speed (or gear) ratio map shown in FIG. 19 on the basis of the throttle valve estimated value $TVO_{EST1}$ and vehicular velocity $V_A(t)$. Then, speed ratio command value DRATIO(t) is derived from vehicular velocity $V_A(t)$ and engine speed command value $V_A(t)$ using the following equation.

Namely, $$DRATIO(t)=N_{IN\_COM}\cdot 2\pi\cdot Rt/[60\cdot V_A(t)\cdot Gf],$$

wherein Gf denotes a final gear ratio.

(2) A case where coast switch 30 is in an on state.

Transmission (gear or speed) ratio command value calculating section 540 holds a previous transmission (gear) ratio command value DRATIO(t−1) as transmission (gear) ratio command value DRATIO(t) in a case where vehicular velocity command maximum value $V_{SMAX}$ is reduced with coast switch 30 operated to be turned on. Even if coast switch 30 is continuously turned to ON, the transmission speed ratio (gear ratio) holds a previous value immediately before coast switch 30 is turned to ON (namely, holds the previous value until coast switch 30 is turned from on state to the off state. Therefore, no downshift occurs. Hence, in a case where set vehicular velocity is returned to the original set vehicular velocity by accelerate switch 40 after set vehicular velocity is largely dropped, the engine throttle valve is controlled in an open direction to accelerate host vehicle. However, even if this occurs, since the downshift operation is not carried out, the engine speed does not quickly increase and a generation of noise given to the vehicular driver can be prevented.

An actual transmission (or gear)ratio (speed ratio in the case of continuously variable transmission 70) calculating block 550 calculates actual speed ratio RATIO(t) according to an engine speed $N_E(t)$ and vehicular velocity $V_A(t)$ using the following equation:

That is to say, $$RATIO(t)=N_E(t)/[V_A(t)\cdot Gf\cdot 2\pi\cdot Rt].$$

It is noted that engine speed $N_E(t)$ is detected by an engine speed sensor 80 detecting an engine crankshaft revolution angle from an ignition signal of engine.

Engine torque command value calculating block 560 shown in FIG. 10 calculates an engine torque command value $TE_{COM}(t)$ in accordance with the following equation from drive torque command value $d_{FC}(t)$ and RATIO(t).

That is to say, $$TE_{COM}(t)=d_{FC}(t)/[Gf\cdot RATIO(t)].$$

Figure 20:
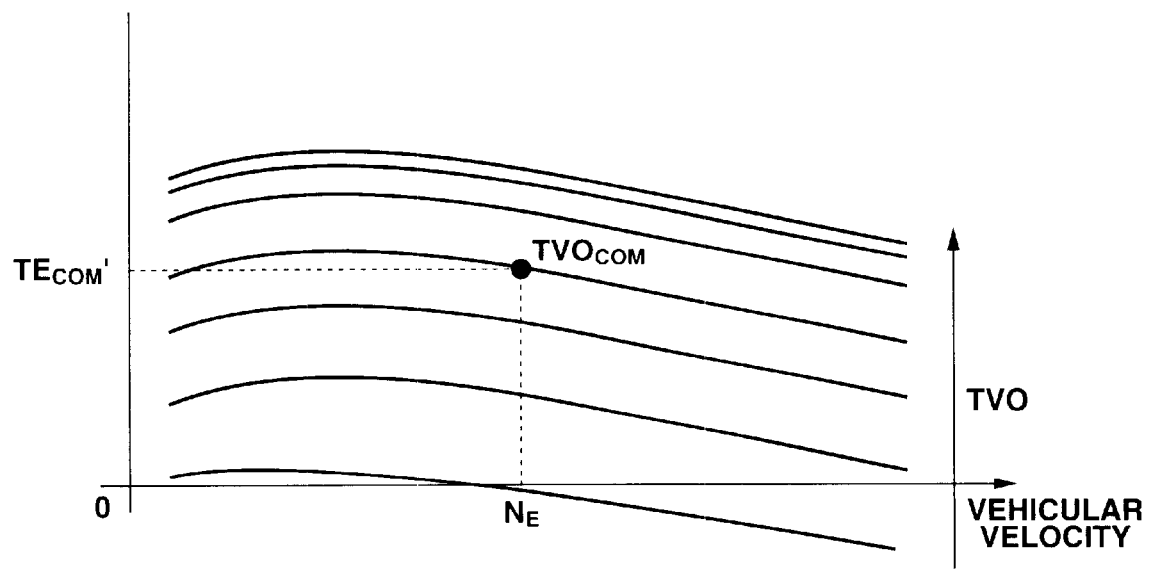
FIG. 20 is a characteristic graph representing one example of an engine whole performance.

A target throttle opening (angle) calculating block 570 calculates a target throttle opening angle $TVO_{COM}$ from an engine whole performance map as shown in FIG. 20 on the basis of engine torque command value $TE_{COM}(t)$ and engine speed $N_E(t)$ and outputs calculated $TVO_{COM}(t)$ to a throttle actuator 60.

A brake pressure command value calculating block 630 shown in FIG. 10 calculates an engine brake torque $TE_{COM}'$ during a full closure throttle from the engine whole performance map shown in FIG. 20, calculates a brake pressure command value $REF_{PBRK}(t)$ from engine brake torque $TE_{COM}'$ and engine torque command value $TE_{COM}(t)$ in accordance with the following equation, and outputs $REF_{PBRK}(t)$ to a brake actuator 50.

That is to say, $$REF_{PBRK}(t)=(TE_{COM}-TE_{COM}')\cdot Gm\cdot Gf/\{4\cdot(2\cdot AB\cdot RB\cdot \mu B)\}.$$

In the above equation, Gm denotes a speed ratio of the continuously variable transmission 70, AB denotes a wheel cylinder force (cylinder pressure·area), RB denotes a disc rotor effective radius, and μB denotes a brake pad frictional coefficient.

Next, a suspension processing of the vehicular velocity control will be described below.

A vehicular velocity suspension deciding block 620 shown in FIG. 10 inputs an accelerator-manipulated variable APO detected by accelerator pedal sensor 90 and compares the accelerator manipulated variable APO with a predetermined value.

This predetermined value is equivalent to accelerator manipulated variable APO1 corresponding to target throttle opening angle TVOCOM inputted from a target throttle opening angle calculating block 570, namely, a value of the throttle valve opening angle corresponding to the automatically controlled vehicular velocity at that time point at which the automatic vehicular velocity control is carried out.

If accelerator manipulated variable is larger than the predetermined value, i.e., the vehicular driver has depressed the accelerator pedal, (in other words, when the throttle valve is opened more widely than the throttle valve opening angle opened by means of throttle actuator 60 at that time point), a vehicular velocity control suspending signal is outputted.

Upon receipt of the vehicular velocity control suspending signal, drive torque command value calculating block 530 and target throttle opening (angle) calculating block 570 initializes the present arithmetic operations (zeroes the variables) and the transmission (CVT) 70 performs a switching from a cruise run purpose speed ratio (gear ratio) map to a normal run purpose speed ratio map through the CYT controller. In other words, the cruise run through the automatic control is suspended and the normal run control is carried out which responds to the vehicular driver's accelerator manipulation.

The continuously variable transmission 70 is provided with the normal run purpose speed ratio map and the cruise run speed ratio map. During the suspension of the cruise run control, the vehicular velocity controlling block 500 outputs a switch command to the continuously variable transmission 70 to switch the map from the cruise run purpose speed ratio map to the normal run purpose speed ratio map. The normal run purpose speed ratio map is a control map such that the downshift during the acceleration is not moderate but is sharp (the response characteristic is favorable) and the cruise run purpose speed ratio map is a control map such that a comfortable feeling is given and response characteristic is moderate. Consequently, the switching causes the vehicular driver not to feel insufficiently.

In addition, vehicular velocity control suspension deciding block 620 halts the output of the vehicular velocity suspending signal when the accelerator manipulated variable APO is returned to a value smaller than the predetermined value and outputs a deceleration request to drive torque command value calculating block 530 in a case where the APO is returned to the value smaller than the predetermined value and vehicular velocity $V_A(t)$ is larger than vehicular velocity command maximum value $V_{CMAX}$. Then, drive torque command value calculating block 530 outputs the calculated driving force command value $d_{FC}(t)$ to target throttle valve opening angle calculating block 570 so as to achieve the deceleration control by the calculated throttle valve opening angle from the driving force command value $d_{FC}(t)$ in the case where the output of the vehicular velocity suspending signal is halted and the deceleration request is inputted. In a case where a braking force only with the throttle valve fully closed is insufficient, transmission (or speed or gear) ratio command value calculating block 540 outputs the transmission (or speed or gear) ratio command value DRATIO (downshift request) to the continuously variable transmission so that the downshift operation of CVT 70 is carried out to compensate for the insufficient braking force, irrespective of the vehicular run on the ascending slope, descending slope or flat road to achieve the throttle valve opening angle control and the speed ratio control of the continuously variable transmission.

In addition, in a case where the driving (in this case, braking) force command value $d_{FC}(t)$ is large and the braking force caused by the downshift operation of the continuously variable transmission 70 gives an upper limit, the driving force is normally (usually) compensated by the activation of brake system when the vehicle is running on the flat road. However, when the vehicle is running on the descending slope, a brake control inhibit signal Bp is outputted from drive torque command value calculating block 530 to the brake pressure command value calculating block 630, thereby the brake control during the run on the descending slope being inhibited. The reason that such a control as described above is carried out is as follows. That is to say, if the deceleration is carried out using the brake system when the vehicle is running on the descending slope, it becomes necessary to continue to be braked through the brake system. Such a problem as a brake fade phenomenon may occur. To avoid an occurrence of the above-described brake fade phenomenon, the vehicular velocity control is carried out to obtain the necessary braking force during the run on the descending slope only by the deceleration caused by the throttle valve opening angle and the downshift control of the continuously variable transmission 70 without use of the brake system of the vehicle.

According to the method described above, even if the cruise run control is recovered after the suspension of the cruise run control thorough a temporal depression of accelerator pedal by the vehicular driver, the downshift operation of the continuously variable transmission can achieve a larger deceleration than that only through the full closure of the throttle valve. Hence, a convergence time duration to the target vehicular velocity can be shortened.

In addition, since the continuously variable transmission 70 is used in the vehicular velocity control, a, so-called, gear shift shock does not occur even on the vehicular run on a long descending slope. Furthermore, since the deceleration is larger than that only through the full closure control for the throttle valve and both the throttle valve opening angle and transmission (gear or speed) ratio are controlled to achieve drive torque based on vehicular velocity command value variation rate $\Delta V_{COM}(t)$, a smooth deceleration can be achieved maintaining a predetermined deceleration.

It is noted that since the gear shift shock is found in a normally available multiple-ratio, geared transmission during the downshift operation, the downshift control for such an automatic transmission as described above has not been carried out but only the throttle valve full closure control has been carried out even in a case where the deceleration control request occurs if the automatic transmission has been used in a previously proposed vehicular velocity control system. However, since the continuously variable transmission is used, a smooth downshift operation can be achieved without gear shift shock. Consequently, a smooth deceleration can be achieved by an implementation of the above-described control at a larger deceleration than that only thorough the full closure control of the throttle valve opening angle.

Next, a stop process of the vehicular velocity control will be described below.

A driven wheel acceleration calculating block 600 shown in FIG. 10 inputs vehicular velocity $V_A(t)$ and calculates a driven wheel acceleration $\alpha_{OBS}(t)$ using the following equation. That is to say, $$\alpha_{OBS}(t)=[K_{OBS}\cdot s/(T_{OBS}\cdot s^2+s+K_{OBS})]\cdot V_A(t).$$

In the above equation, $K_{OBS}$ denotes a constant and $T_{OBS}$ denotes a time constant.

It is noted that since vehicular velocity $V_A(t)$ in the above equation is a value calculated from a revolution velocity of the tire wheel (the driven wheel) as described above, the value thereof corresponds to the vehicular velocity of the driven wheel and the driven wheel acceleration $\alpha_{OBS}(t)$ is a value of a variation rate (driven wheel acceleration) of the vehicular velocity derived from driven wheel acceleration $V_A(t)$.

A vehicular velocity control stop deciding block 610 compares driven wheel acceleration $\alpha_{OBS}(t)$ with a predetermined acceleration limitation value $\alpha$ ($\alpha$ denotes the acceleration value corresponding to the variation rate of the vehicular velocity and, for example, 0.2 G). If driven wheel acceleration $\alpha_{OBS}(t)$ is in excess of the acceleration limitation value $\alpha$, a vehicular velocity control stop signal is outputted. According to this vehicular velocity control stop signal, drive torque command value calculating block 530 and target throttle opening angle calculating block 570 initialize the arithmetic operations (calculations) thereof. It is noted that once the vehicular velocity is once stopped, a control is not returned to the vehicular velocity control until set switch 20 is again turned to ON.

The vehicular velocity controlling block 500 recited in FIG. 10 is a system controlling the vehicular velocity at the vehicular velocity command value based on the vehicular velocity command value variation rate $\Delta V_{COM}$. Determined according to vehicular velocity command value variation rate determining block 590. Therefore, in the normal state, no variation in the vehicular velocity exceeding vehicular velocity command value variation rate limitation value occurs [for example, 0.06G=0.021 (km/h)/10 (milliseconds)]. Hence, there is a high possibility that a slip occurs on the driven wheel(s) if driven wheel acceleration $\alpha_{OBS}(t)$ is in excess of a predetermined acceleration limitation value $\alpha$ (for example, 0.2 G) larger than a value corresponding to the above-described vehicular velocity command value variation rate limitation value. Thus, the slip on driven wheel(s) can be detected by comparing driven wheel acceleration $\alpha_{OBS(t)}$ with a predetermined acceleration limitation value $\alpha$ (for example, 0.2 G). Therefore, it is not necessary to install additionally an acceleration sensor in a slip suppression system such as a traction control system (TCS) or to detect a difference in revolution speed between one of the driven wheels and one of non-driven wheels. Driven wheel acceleration $\alpha_{OBS}$ can be derived according to the output of vehicular velocity sensor (the sensor to detect the revolution speed of driven wheel) so that a slip occurrence determination and a stop determination of the vehicular velocity control can be made.

In addition, the response characteristic to the target vehicular velocity can be improved by enlarging vehicular velocity command value $\Delta V_{COM}$. It is noted that in place of a determination of the cruise run control stop according to a comparison result between driven wheel acceleration $\alpha_{OBS}(t)$ with a predetermined value, the vehicular velocity control stop may be carried out in a case where a difference between vehicular velocity command value variation rate $\Delta V_{COM}$ calculated by vehicular velocity command value variation rate determining block 590 and driven wheel acceleration $\alpha_{OBS}(t)$ becomes equal to or larger than a predetermined value.

In addition, vehicular velocity command value determining block 510 determines whether the preceding vehicle is detected or not according to an indication of the preceding vehicle flag F. If determining that no preceding vehicle is detected, vehicular velocity command value determining block 510 determines whether vehicular velocity command value $V_{COM}(t)$ calculated by itself is higher than the inputted vehicular velocity $V_A(t)$ and determines whether the vehicular velocity is changed in the deceleration mode (i.e., if $V_{SMAX}<V_A(t)$). Then, vehicular velocity command value $V_{COM}$ is set to vehicular velocity $V_A(t)$ or a smaller predetermined vehicular velocity (for example, a value of subtraction of 5 km/h from vehicular velocity of the host vehicle). Then, an initial value of the integrator of each of $C_1(s)$ and $C_2(s)$ is set to vehicular velocity $V_A(t)$ so as to zero the output of $C_2(s)\cdot V_A(t)-C_1(s)\cdot d_{FC}(t)=dv(t)$ in drive torque command value calculating block 530 shown in FIG. 16. Consequently, each output of $C_1(s)$ and $C_2(s)$ indicates vehicular velocity $V_A(t)$. Consequently, external disturbance estimation value $d_V(t)$ indicates zero.

Furthermore, a case where $\Delta V_{COM}(t)$ which is a variation rate of $V_{COM}(t)$ is larger at a deceleration side than the predetermined value (0.06G) is a timing at which the above-described stop control is carried out.

Since this reduces an unnecessary initialization ($V_A(t) \rightarrow V_{COM}(t)$ initialization and integrator initialization), a deceleration shock can be relieved.

In a case where the vehicular velocity command value (instantaneous control command value until the vehicular velocity reaches to a target vehicular velocity) is larger than actual vehicular velocity $V_A(t)$ and a variation in time of the vehicular velocity command value occurs in the deceleration side, the vehicular velocity command value is modified to actual vehicular velocity or predetermined vehicular velocity equal to or lower than actual vehicular velocity so that the vehicular velocity can quickly be converged to target vehicular velocity. A control continuity can be maintained by initializing drive torque command value calculating block 530 using the set actual vehicular velocity or lower than the actual vehicular velocity.

It is noted that in a vehicular velocity control system in which the vehicular velocity is controlled to make the actual inter-vehicle distance coincident with a target inter-vehicle distance so that the vehicle is running maintaining the target inter-vehicle distance to the preceding vehicle set by the vehicular driver, the vehicular velocity command value is set to maintain the target inter-vehicle distance. However, if the vehicular velocity control system (corresponding to the vehicular velocity controlling block 500) determines that the preceding vehicle is detected according to the input preceding vehicle flag F, the modification of vehicular velocity command value $V_{COM}(t)$ [$V_A(t) \rightarrow V_{COM}(t)$] and the initialization of drive torque command value calculating block 530 (specifically, the integrator incorporated therein) are carried out in a case where the actual inter-vehicle distance is equal to or shorter than the predetermined value and the vehicular velocity command value variation rate $\Delta V_{COM}(t)$ is larger than the predetermined value (0.06G) in the deceleration side. Thus, the actual inter-vehicle distance can speedily be converged to the target inter-vehicle distance. Hence, there is no possibility of excessive approach to the preceding vehicle and the continuity of control can be maintained. In addition, this causes reductions in unnecessary initializations [initialization of $V_A(t)$ $\Delta V_{COM}(t)$] and initialization of the integrators] so that the number of the deceleration shock becomes reduced.

It is noted that the vehicular driver is included in the vehicular occupant or an operator who handles the automatic vehicular velocity controlling system through the above-described switches.

The entire contents of Japanese Patent Applications No. 2000-148732 (filed in Japan on May 19, 2000) and No. 2000-14361 (filed in Japan on May 16, 2000) are herein incorporated by reference.

Modifications and variations of the embodiments described above will occur to those skilled in the art in the light of the above teachings. The scope of the invention is defined with reference to the following claims.

INDUSTRIAL APPLICABILITY

Automatic vehicular velocity controlling system and method according to the present invention is applicable to an automotive vehicle in which a vehicular transmission such as a continuously variable transmission and an inter-vehicle distance sensor to detect a distance from the vehicle to a preceding vehicle which is running ahead of the vehicle are equipped.

What is claimed is:

1. An automatic vehicular velocity controlling system for an automotive vehicle, comprising;
   a vehicular velocity controlling command value determining section that selectively determines a vehicular velocity controlling command value from one of a first set vehicular velocity based on an inter-vehicle distance control for a preceding vehicle which is running ahead of the vehicle and a second set vehicular velocity based on a manual setting depending upon a magnitude of which one is smaller than the other and depending upon whether the preceding vehicle is present;
   a vehicular drive controlling section that drivingly controls one of a vehicular engine, a vehicular transmission, and a vehicular brake system to make an actual vehicular velocity substantially equal to the vehicular velocity controlling command value;
   a vehicular velocity controlling vehicular velocity command value modification determining section that determines whether a modification of the vehicular velocity controlling command value to a new one is made; and
   a vehicular velocity command value variation rate determining section that determines a deviation between the new vehicular velocity command value and the actual vehicular velocity and determines a variation rate for the vehicular velocity to reach to the new vehicular velocity command value when the vehicular velocity command value modification determining section determines that the modification is made in such a manner that as a magnitude of the deviation becomes larger, the variation rate becomes larger and as the magnitude of the deviation becomes smaller, the variation rate becomes smaller.

2. An automatic vehicular velocity controlling system for an automotive vehicle as claimed in claim 1, wherein the vehicular drive controlling section drivingly controls one of the vehicular engine, transmission, and brake system in such a manner that the actual vehicular velocity is made substantially equal to the new vehicular velocity controlling command value at the variation rate determined by the vehicular velocity controlling command value variation rate determining section.

3. An automatic vehicular velocity controlling system for an automotive vehicle as claimed in claim 2, wherein the vehicular velocity controlling command value variation rate determining section comprises a vehicular velocity command value variation rate determining block that calculates a vehicular velocity command value variation rate $\Delta V_{COM}(t)$ on a basis of an absolute value of a deviation between the actual velocity $V_A(t)$ and a vehicular velocity command maximum value $V_{SMAX}$ which corresponds to the second set vehicular velocity when the preceding vehicle detector detects that the preceding vehicle is absent.

4. An automatic vehicular velocity controlling system for an automotive vehicle as claimed in claim 1, further comprising: a vehicular velocity detector to detect the actual vehicular velocity;
   an inter-vehicle distance detector to detect an inter-vehicle distance from the vehicle to the preceding vehicle; and
   an inter-vehicle distance controlling block that provides an inter-vehicle related controlling vehicular velocity command value to maintain the actual inter-vehicle distance at a target inter-vehicle distance on the basis of the detected inter-vehicle distance and the detected vehicular velocity for the vehicular velocity controlling command value determining section, the inter-vehicle related controlling vehicular velocity command value corresponding to the first set vehicular velocity.

5. An automatic vehicular velocity controlling system for an automotive vehicle as claimed in claim 4, further comprising a preceding vehicle detector to detect whether the preceding vehicle is present on the basis of the inter-vehicle distance detected by the inter-vehicle distance detector and wherein the vehicular velocity controlling vehicular velocity command value determining section selects one of the first set vehicular velocity and the second set vehicular velocity which is smaller than the other to the vehicular velocity controlling command value $V_{COM}(t)$ as the target vehicular velocity when the preceding vehicle detector detects that the preceding vehicle is present and selects the second set vehicular velocity as the vehicular velocity controlling command value $V_{COM}(t)$ when the preceding vehicle detector detects that the preceding vehicle is absent.

6. An automatic vehicular velocity controlling system for an automotive vehicle as claimed in claim 5, wherein when the inter-vehicle related controlling vehicular velocity command value $V^*(t)$ is selectively set as the target vehicular velocity and the set vehicular velocity modification determining section determines that the first set vehicular velocity which corresponds to the inter-vehicle related controlling vehicular velocity command value is modified to the new set vehicular velocity, the variation rate for the vehicular velocity is determined in accordance with the magnitude of the deviation.

7. An automatic vehicular velocity controlling system for an automotive vehicle as claimed in claim 6, wherein the vehicular velocity command value determining block sets the vehicular velocity command value $V_{COM}(t)$ as the set vehicular velocity in the following manner: $V_{COM}(t)=\min[V_{SMAX}, V_A(t)+\Delta V_{COM}(t)-V_{SUB}(t)]$ when $V_{SMAX}>V_A(t)$, wherein $V_{SUB}(t)$ denotes a vehicular velocity correction value; $V_{COM}(t)=V_{SMAX}-V_{SUB}(t)$ when $V_{SMAX}=V_A(t)$; and $V_{COM}(t)=\max[V_{SMAX}, V_A(t)-\Delta V_{COM}(t)-V_{SUB}(t)]$ when $V_{SMAX}<V_A(t)$ and; $V_{COM}(t)=V_{CO}-V_{SUB}(t)$ when the preceding vehicle detector detects that the preceding vehicle is present, wherein $V_{CO}=\min[V^*(t), V_{SMAX}]$.

8. An automatic vehicular velocity controlling system for an automotive vehicle as claimed in claim 4, further comprising a set switch, an accelerate switch, and a coast switch, and a vehicular velocity command maximum value setting block that sets the actual vehicular velocity $V_A(t)$ when the set switch is once operated as the vehicular velocity command maximum value $V_{SMAX}$ and updates the original vehicular velocity command maximum value $V_{SMAX}$ to a new vehicular velocity command maximum value $V_{SMAX}$ lower than the original vehicular velocity command value $V_{SMAX}$ by n× a unit of a predetermined velocity whenever the coast switch is operated by the n number of times and updates the original vehicular velocity command maximum value $V_{SMAX}$ to the new vehicular velocity maximum value $V_{SMAX}$ higher than the original vehicular velocity command value $V_{SMAX}$ by n× the unit of the predetermined velocity whenever the accelerate switch is operated by the n number of times.

9. An automatic vehicular velocity controlling system for an automotive vehicle as claimed in claim 1, wherein as the absolute value of the deviation becomes larger, a vehicular velocity command value variation rate $\Delta V_{COM}(t)$ which corresponds to the variation rate becomes larger to a degree below a predetermined acceleration upper limitation value α.

10. An automatic vehicular velocity controlling system for an automotive vehicle as claimed in claim 9, wherein the vehicular velocity command value variation rate determining section comprises a vehicular velocity command value variation rate determining block that calculates a vehicular velocity command value variation rate $\Delta V_{COM}(t)$ on the basis of an absolute value of a deviation between the actual velocity $V_A(t)$ and a vehicular velocity command maximum value $V_{SMAX}$ which corresponds to the second set vehicular velocity from a map when the preceding vehicle detector detects that the preceding vehicle is absent, the map being represented in such a manner that as the absolute value of the actual vehicular velocity and the vehicular velocity command maximum value $V_{SMAX}$ becomes larger, the variation rate becomes larger and as the absolute value of the actual vehicular velocity in a predetermined range and the vehicular velocity command maximum value $V_{SMAX}$ becomes smaller, the variation rate for the vehicular velocity becomes smaller in the predetermined range.

11. An automatic vehicular velocity controlling system for an automotive vehicle as claimed in claim 1, wherein as an absolute value of the deviation becomes smaller, a vehicular velocity command value variation rate $\Delta V_{COM}(t)$ becomes smaller to a degree above a predetermined acceleration lower limitation value.

12. An automatic vehicular velocity controlling method for an automotive vehicle, comprising;

selectively determining a vehicular velocity controlling command value from one of a first set vehicular velocity based on an inter-vehicle distance control for a preceding vehicle which is running ahead of the vehicle and a second set vehicular velocity based on a manual setting depending upon a magnitude of which one is smaller than the other and depending upon whether the preceding vehicle is present;

drivingly controlling one of a vehicular engine, a vehicular transmission, and a vehicular brake system to make an actual vehicular velocity substantially equal to the vehicular velocity controlling command value;

determining whether a modification of the vehicular velocity controlling command value to a new one is made; and determining a deviation between the new vehicular velocity command value and the actual vehicular velocity and determines a variation rate for the vehicular velocity to reach to the new vehicular velocity command value when the vehicular velocity command value modification determining section determines that the modification is made in such a manner that as a magnitude of the deviation becomes larger, the variation rate becomes larger and as the magnitude of the deviation becomes smaller, the variation rate becomes smaller.

* * * * *